US008770600B2

(12) United States Patent  
Preidt et al.

(10) Patent No.: US 8,770,600 B2  
(45) Date of Patent: Jul. 8, 2014

(54) RETAIL CART

(71) Applicant: Effizient, LLC, Grand Haven, MI (US)

(72) Inventors: Ludwig Klaus Preidt, Grand Rapids, MI (US); Karl Ronald Chapel, Grand Haven, MI (US); Thomas A. Nakfoor, Ada, MI (US)

(73) Assignee: Effizient, LLC, Grand Haven, MI (US)

( * ) Notice: Subject to any disclaimer, the term of this patent is extended or adjusted under 35 U.S.C. 154(b) by 12 days.

(21) Appl. No.: 13/893,457

(22) Filed: May 14, 2013

(65) Prior Publication Data

US 2013/0240472 A1    Sep. 19, 2013

Related U.S. Application Data

(63) Continuation-in-part of application No. 13/314,883, filed on Dec. 8, 2011, now Pat. No. 8,739,986.

(51) Int. Cl.
| | |
|---|---|
| *B62B 1/00* | (2006.01) |
| *A47F 5/00* | (2006.01) |
| *A47F 5/13* | (2006.01) |
| *A47B 91/00* | (2006.01) |
| *A47B 31/00* | (2006.01) |

(52) U.S. Cl.  
CPC .............. *A47F 5/0093* (2013.01); *A47F 5/00* (2013.01); *A47B 2031/003* (2013.01); *A47F 5/137* (2013.01)  
USPC ...................... 280/79.3; 280/47.16; 108/187

(58) Field of Classification Search  
CPC .. A47B 87/0246; A47B 57/06; A47B 47/021; A47B 57/265; A47B 57/545; A47B 87/0207; A47B 47/045; A47B 47/04; A47B 47/02; A47B 47/022; A47B 47/0058; A47B 47/0008; B65G 1/02; A47F 5/01; A47F 7/0021; A47F 5/13; A47F 5/0093  
USPC .............. 211/133.5, 134, 151, 153, 186, 188, 211/192, 194; 108/180, 181, 186, 187, 189  
See application file for complete search history.

(56) References Cited

U.S. PATENT DOCUMENTS

| | | | | |
|---|---|---|---|---|
| 2,046,095 | A | * | 6/1936 | Shaw .......................... 211/85.17 |
| 2,864,512 | A | | 9/1955 | Hoose |
| 2,891,677 | A | | 6/1959 | Ritchie |
| 2,919,816 | A | | 1/1960 | Maslow |
| 2,982,424 | A | * | 5/1961 | Van Syoc, Sr. ............... 108/187 |
| 3,007,708 | A | | 11/1961 | Ochs |
| 3,145,850 | A | | 8/1964 | Ciborowski |
| 3,146,735 | A | | 9/1964 | Kesilman et al. |
| 3,252,434 | A | | 5/1966 | Young, Jr. |
| 3,316,864 | A | * | 5/1967 | Maslow ........................ 108/148 |
| 3,506,138 | A | * | 4/1970 | Travis ............................. 108/91 |
| 3,536,016 | A | | 10/1970 | Chesley |
| 3,565,020 | A | * | 2/1971 | Schier et al. ................... 108/152 |
| 3,589,746 | A | | 6/1971 | Inglis et al. |
| 3,599,580 | A | * | 8/1971 | Adair et al. .............. 108/157.13 |
| 3,654,879 | A | * | 4/1972 | Ferdinand et al. ............ 108/110 |
| 3,696,763 | A | | 10/1972 | Evans |

(Continued)

*Primary Examiner* — Joshua L Michener  
*Assistant Examiner* — Devin Barnett  
(74) *Attorney, Agent, or Firm* — Price Heneveld LLP

(57) ABSTRACT

A retail cart for use in storing and stocking merchandise and, more particularly, to a mobile polymeric retail cart which is easily assembled and disassembled without the need for tools having opposing forces in its construction lending rigidity to the overall structure and a plurality of slideably received shelving units.

7 Claims, 29 Drawing Sheets

(56) References Cited

U.S. PATENT DOCUMENTS

| | | | | |
|---|---|---|---|---|
| 3,730,108 | A | 5/1973 | Stroh | |
| 3,802,574 | A * | 4/1974 | Weider | 211/134 |
| RE28,244 | E * | 11/1974 | Evans | 108/157.13 |
| 3,977,529 | A * | 8/1976 | Stroh | 211/187 |
| 3,977,689 | A | 8/1976 | Rosa | |
| 4,045,043 | A | 8/1977 | Fourrey | |
| 4,231,298 | A | 11/1980 | Pollack | |
| 4,593,826 | A | 6/1986 | Bustos | |
| 4,728,158 | A * | 3/1988 | D'Elia et al. | 312/108 |
| 4,844,393 | A * | 7/1989 | Lee | 248/165 |
| 4,890,748 | A * | 1/1990 | Visser | 211/133.1 |
| 5,027,959 | A * | 7/1991 | Luukkonen | 211/186 |
| 5,065,873 | A | 11/1991 | Tseng | |
| 5,279,430 | A * | 1/1994 | Benton | 211/151 |
| 5,312,004 | A * | 5/1994 | Krummell et al. | 211/151 |
| 5,419,444 | A * | 5/1995 | Strom | 211/151 |
| 5,476,180 | A * | 12/1995 | Konstant | 211/151 |
| 5,718,441 | A | 2/1998 | Kern et al. | |
| 5,845,794 | A * | 12/1998 | Highsmith | 211/189 |
| 6,173,847 | B1 | 1/2001 | Zellner, III et al. | |
| 6,460,710 | B1 | 10/2002 | Dardashti | |
| 6,659,294 | B1 | 12/2003 | Simard | |
| 6,733,222 | B2 * | 5/2004 | Freudelsperger | 414/276 |
| 6,971,529 | B1 * | 12/2005 | Shapiro | 211/188 |
| 8,025,148 | B2 | 9/2011 | Artinger | |
| 8,079,313 | B2 | 12/2011 | Sparkowski | |
| 8,196,761 | B2 | 6/2012 | Morandi | |
| 2002/0027114 | A1 * | 3/2002 | Krusell | 211/85.7 |
| 2002/0179555 | A1 * | 12/2002 | Pater | 211/151 |
| 2005/0082246 | A1 * | 4/2005 | Krummell et al. | 211/151 |
| 2005/0218096 | A1 | 10/2005 | Dunn | |
| 2007/0158289 | A1 | 7/2007 | Chen | |
| 2009/0139913 | A1 * | 6/2009 | Pippin et al. | 209/584 |
| 2011/0220602 | A1 | 9/2011 | Chen | |
| 2012/0285916 | A1 * | 11/2012 | O'Quinn et al. | 211/151 |

\* cited by examiner

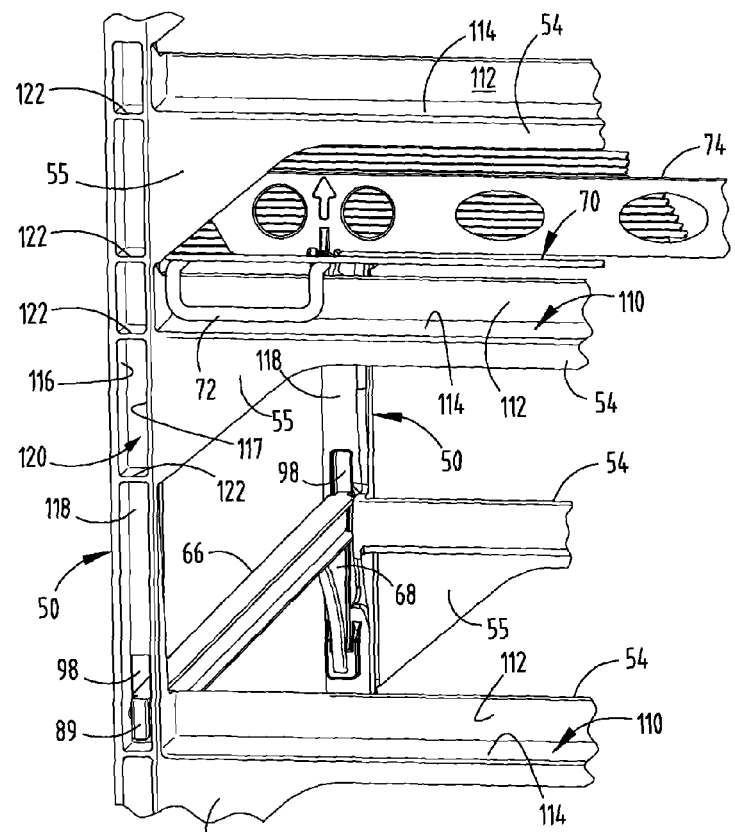
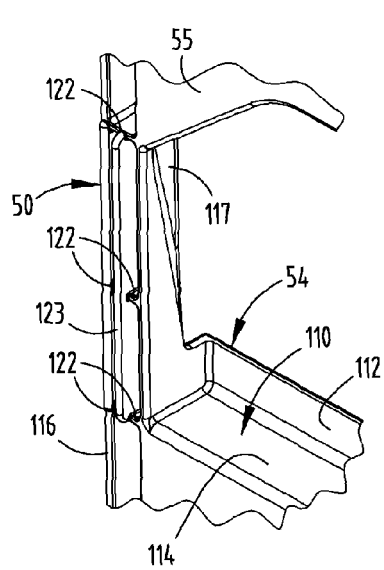
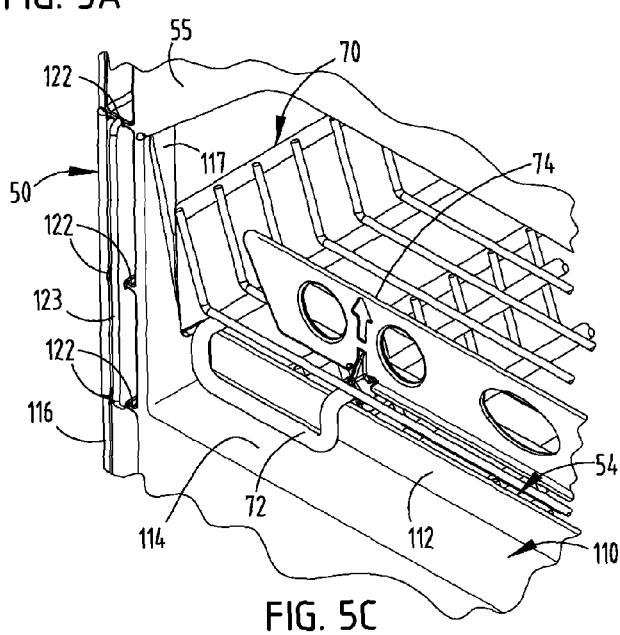
FIG. 5A
FIG. 5B
FIG. 5C

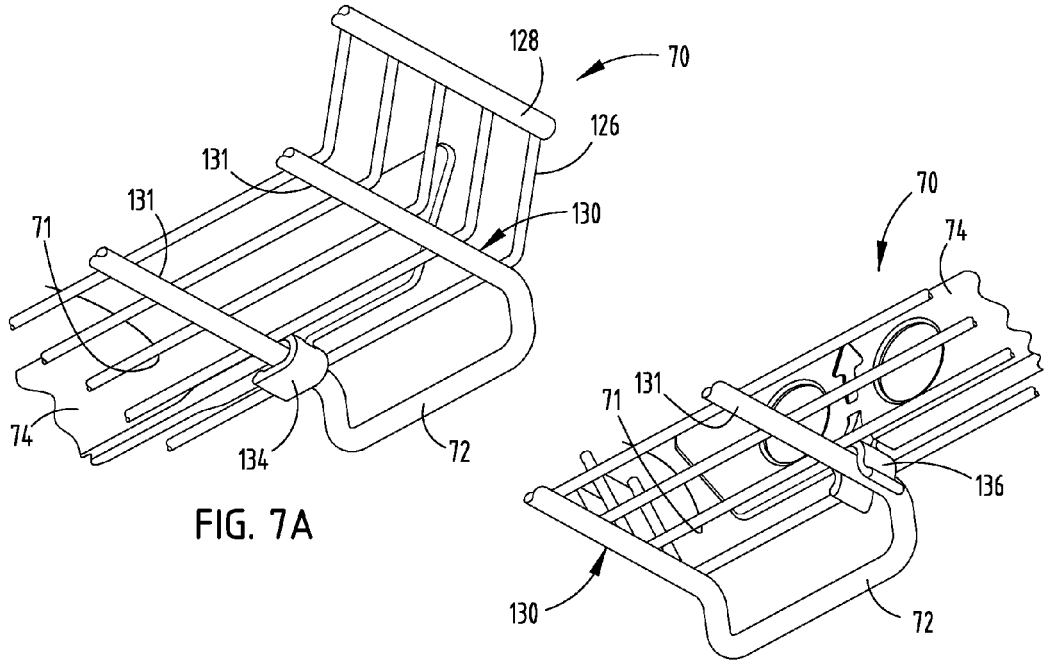
FIG. 7A
FIG. 7B
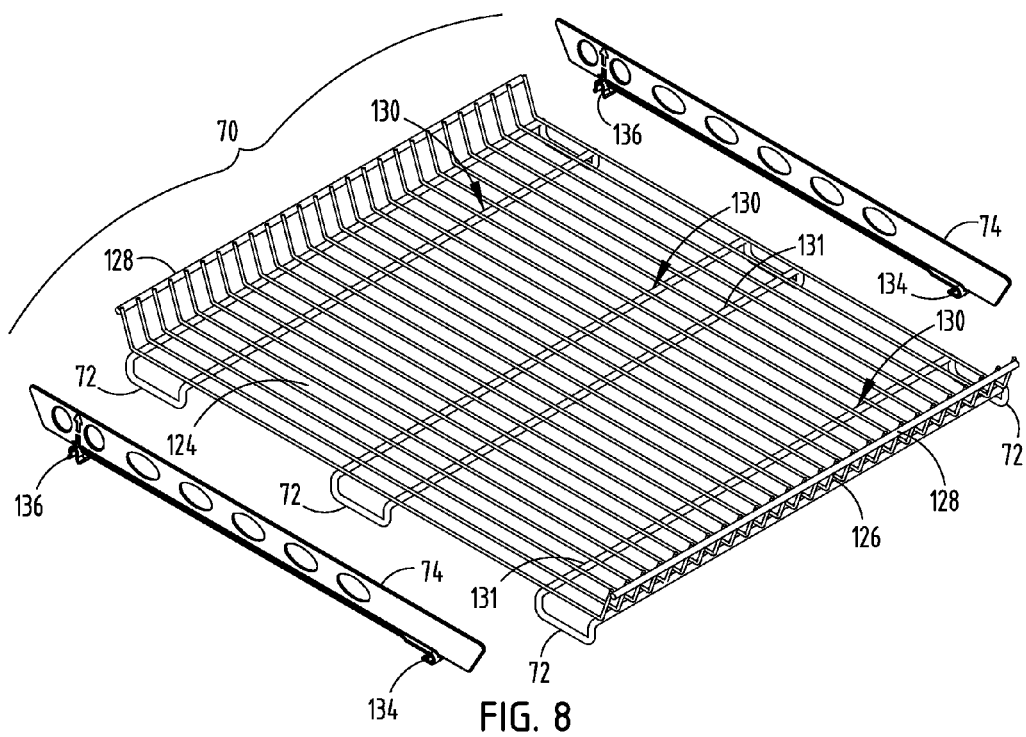
FIG. 8

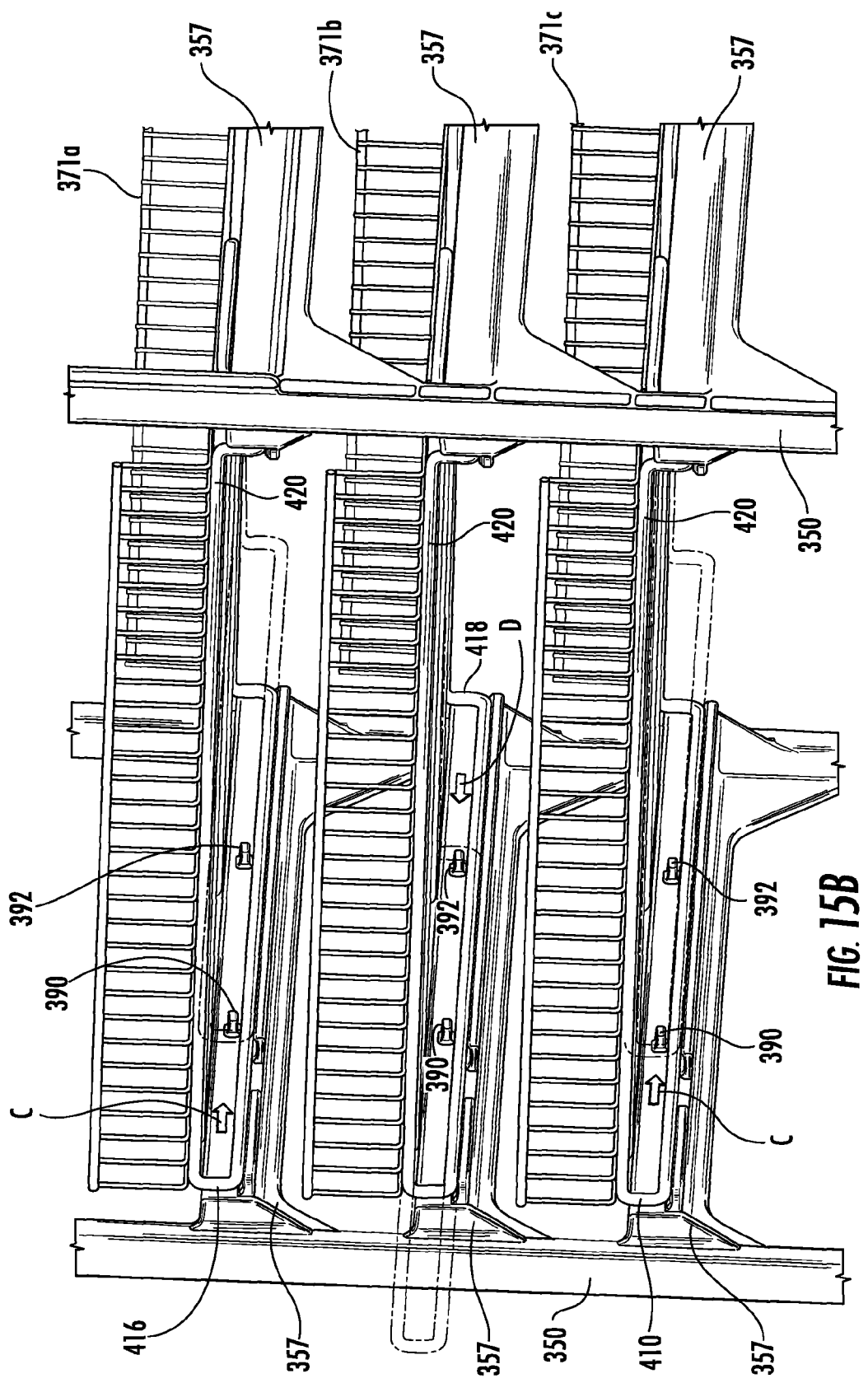

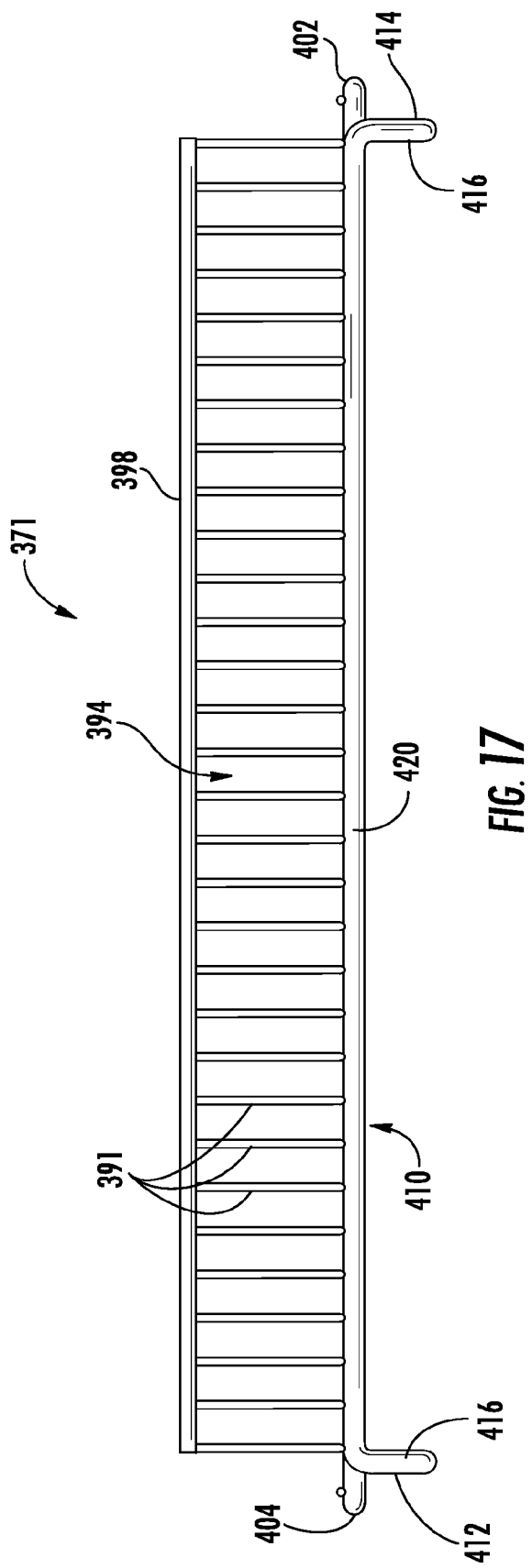

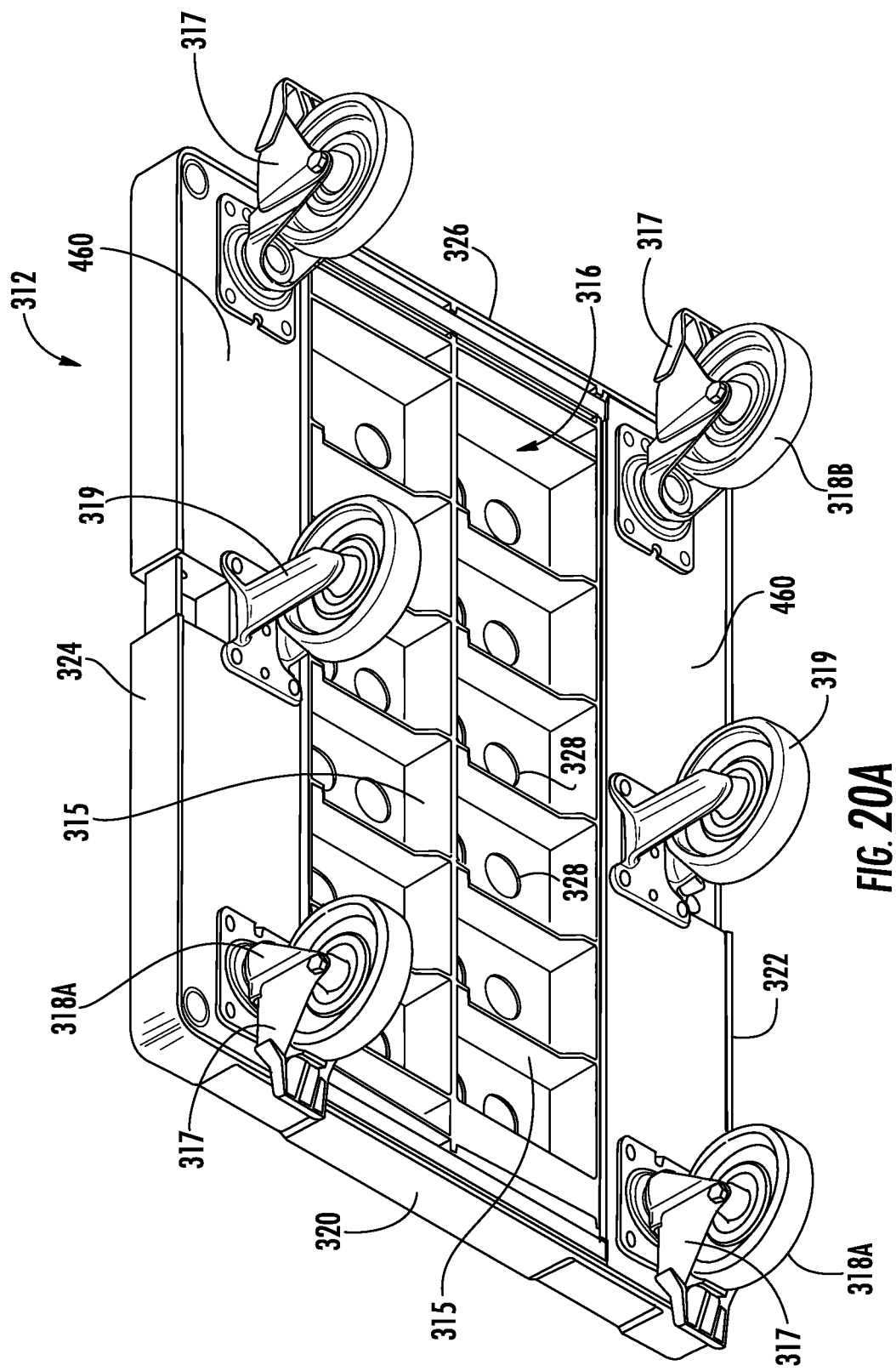

RETAIL CART

CROSS-REFERENCE TO RELATED APPLICATION

This application is a divisional of U.S. patent application Ser. No. 13/314,883, filed Dec. 8, 2011, entitled "RETAIL CART", the entire disclosure of which is incorporated herein by reference.

FIELD OF THE INVENTION

The present invention generally relates to a retail cart for use in storing and stocking merchandise and, more particularly, to a mobile polymeric retail cart which is easily assembled and disassembled without the need for tools.

BACKGROUND OF THE INVENTION

Retail or merchandise carts are known in the art for use in storing and stocking merchandise at a retail location. Generally, these carts are mobile carts with an upright frame assembly made from metal. These metal frame assemblies provide sound structure and rigidity for the retail carts, however, they are heavy and often require special tooling to assemble the frame as well as to attach the frame on a mobile base.

The present invention provides a polymeric retail cart having the structural rigidity necessary to support a vertical frame assembly while being composed of polymeric materials for decreasing the weight of the overall unit and, thereby increasing the ease of mobility of the unit.

SUMMARY OF THE INVENTION

One aspect of the present invention includes a retail cart for use in transporting merchandise, comprising a base unit having an upper side and an underside with a plurality of mobile transport rollers coupled to the underside of the base unit. First and second side attachment members are operably coupled to the upper side of the base unit in a generally upright, parallel, laterally spaced-apart relationship. Each side attachment member includes an outer frame member comprising an upper crossbar, a lower crossbar and laterally spaced uprights. A plurality of support members having shelf receiving channels are disposed between the laterally spaced uprights of each side attachment member. At least one shelving unit is slideably and removably received in the shelf receiving channels of the support members. The retail cart is adapted to support a number of different shelving units. At least one handle member is operably coupled to an upright of the first side attachment member at a first end and operably coupled to an upright of the second side attachment member at a second end. A plurality of stabilizers are removably and operably coupled to an upright of the first side attachment member at a first end and operably coupled to an upright of the second side attachment member at a second end.

Another aspect of the present invention includes a retail cart for use in transporting merchandise, comprising a base unit having an upper side and an underside wherein a plurality of mobile transport rollers are coupled to the underside of the base unit. First and second side attachment members are operably coupled to the upper side of the base unit in a generally upright, parallel, laterally spaced-apart relationship, wherein each side attachment member includes a frame member comprising upper and lower crossbars and laterally spaced uprights with a plurality of support members disposed between the laterally spaced uprights having shelf receiving channels. A plurality of stabilizers are operably coupled to an upright of the first side attachment member at a first end and operably coupled to an upright of the second side attachment member at a second end. A plurality of removable shelving units are slideably received in the shelf receiving channels of the support members. The shelving units further include a landing surface disposed between laterally spaced apart retaining edges having upper crossbars, wherein the upper crossbars are positively captured between an upright of the first side attachment member at a first end and an upright of the second side attachment member at a second end when the shelving unit is in a fully stowed position thereby imparting a first force on the first and second side attachment members. The shelving units further include a plurality of downwardly facing shelving unit support guides disposed adjacent to the landing surface for engaging the shelf receiving channels of the support members thereby imparting a second force on the support members in opposition to the first force.

Yet another aspect of the present invention includes a retail cart for use in transporting merchandise, comprising a base unit having an upper side and an underside wherein a plurality of mobile transport rollers are coupled to the underside of the base unit. First and second side attachment members are detachably coupled to the upper side of the base unit in a generally upright, parallel, laterally spaced-apart relationship, wherein each side attachment member includes a one-piece polymeric frame member comprising an upper crossbar, a lower crossbar and laterally spaced uprights. A plurality of stabilizers are operably coupled to an upright of the first side attachment member at a first end and operably coupled to an upright of the second side attachment member at a second end. A plurality of support members are disposed between the laterally spaced uprights of each of the side attachment members having shelf receiving channels disposed thereon. At least one shelving unit is slideably and removably received in the shelf receiving channels of the support members.

These and other features, objects and advantages of the present invention will become apparent upon reading the following description thereof together with reference to the accompanying drawings.

BRIEF DESCRIPTION OF THE DRAWINGS

FIG. 5A is a fragmentary perspective view of a support member having a shelf receiving channel;

FIG. 5B is a fragmentary perspective view of a support member having a shelf receiving channel;

FIG. 5C is a fragmentary perspective view of a support member engaged with a shelving unit;

FIGS. 7A and 7B are fragmentary perspective views of a shelving unit and a divider assembly;

FIG. 8 is an exploded perspective view of a shelving unit and divider assemblies;

FIG. 15B is a fragmentary view of the retail cart of FIG. 15A;

FIG. 17 is a front elevational view of the wire shelf of FIG. 16;

FIG. 20A is a bottom perspective view of a base unit;

DETAILED DESCRIPTION OF THE PREFERRED EMBODIMENT

Figure 1:
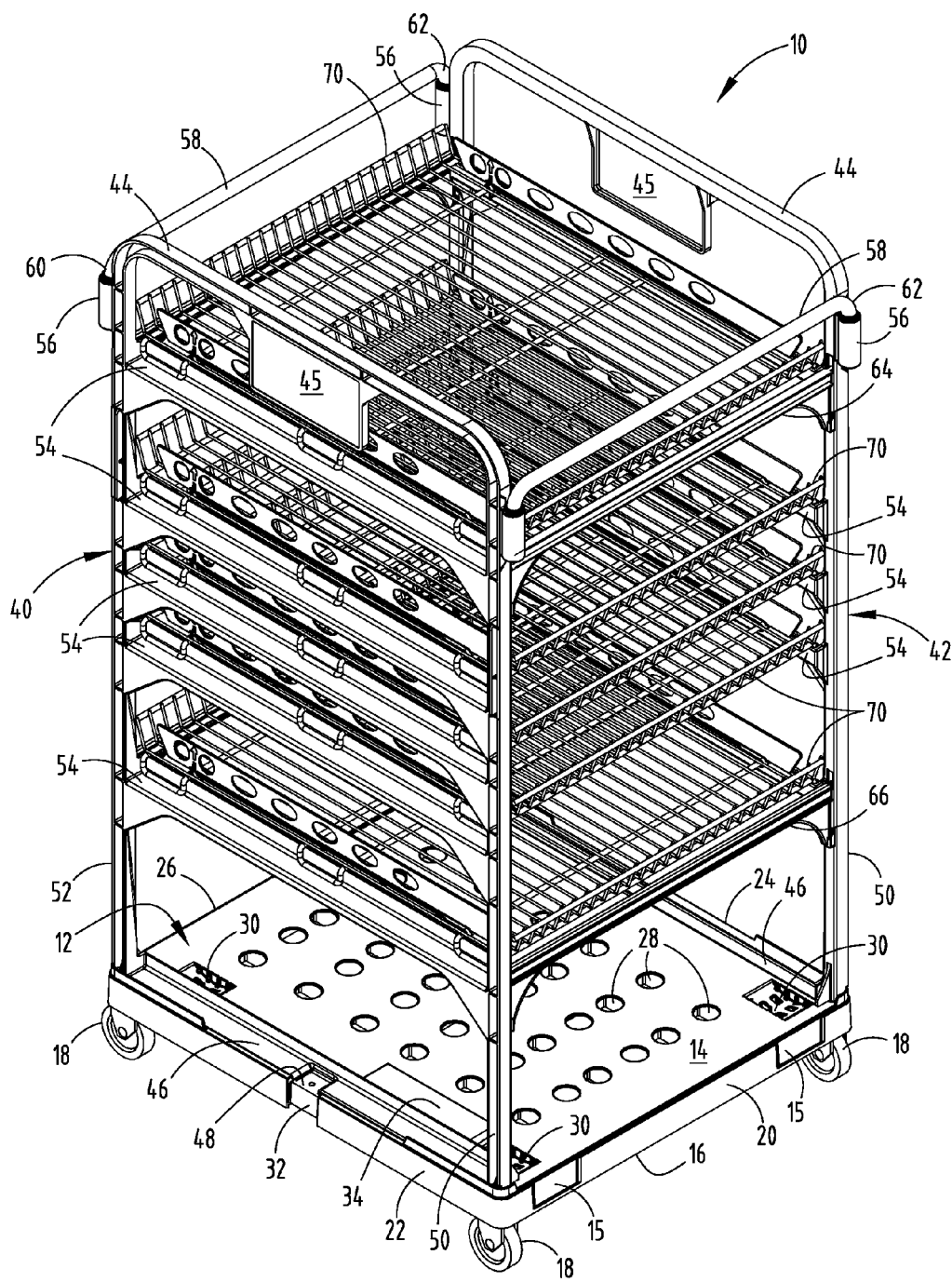
FIG. 1 is a perspective view of a retail cart according to embodiments of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring to FIG. 1, the reference numeral 10 generally designates a retail cart of the present invention. The retail cart includes a base unit 12 having an upper surface 14 and a lower surface 16. As shown in FIG. 1, the base unit 12 has a plurality of mobile transport rollers 18 operably coupled to the underside or lower surface 16 of the base unit 12. In the embodiment shown in FIG. 1, the mobile transport rollers 18 are in the form of casters which can be rigid or swivel casters known in the art. The base unit 12 comprises a front wall 20, first and second side walls 22, 24, and a rear wall 26, giving the base unit 12 an overall rectangular configuration. The upper surface 14 defines a landing area having a plurality of apertures 28 disposed thereon. The upper surface or upper side 14 of the base unit 12 further comprises detents 30 disposed in the four corners of the upper surface 14, which are configured to house mobile transport rollers of an additional base unit when one base unit is stacked upon another. The detents 30 are designed to retain the mobile transport rollers or casters of an additional base unit during transport. The side walls 22, 24 further comprise recessed areas 32 which extend around the side walls 22, 24 to the upper surface 14 of the base unit 12 to provide a nip for use in coupling the base unit 12 to a side attachment member as further described below. Upper surface 14 of base unit 12 further comprises a smooth flat area 34, which is adapted to receive a warning or other type of informational label. It is noted that the front wall 20, rear wall 26, and side walls 22, 24 of the base unit 12 can be configured with brand information tailored to the retail location for which the retail cart 10 will be used. Specifically, label areas 15 disposed on the front wall 20 of the cart 10 can be used to display bar code labels containing identifying information about the cart, the retail location, or the merchandise stored in the cart. In the embodiment shown in FIG. 1, the base unit 12 is comprised of a polymeric material having internal structural reinforcements disposed between the upper and lower surfaces 14, 16.

The retail cart 10 of the present invention further comprises first and second side attachment members 40, 42 which essentially create a structure for the retail cart 10. The first and second side attachment members 40, 42 are operably coupled to the base unit 12 as further described below. The first and second side attachment members 40, 42 are shown in FIG. 1 as one-piece polymeric side attachment members having the same overall configuration as compared to the other. Thus, as shown in FIG. 1, first side attachment member 40 is disposed on the base unit 12 adjacent the side wall 22. First side attachment member 40 can also be rotated and coupled to the base unit 12 on the right side of the base unit 12 adjacent side wall 24. Likewise, second side attachment member 42, as shown in FIG. 1, can occupy the left side of the base unit 12 adjacent side wall 22. In this way, the retail cart 10 is easily assembled as the side attachment members 40, 42 are not designated for a specific attachment location on the base unit 12. The first and second side attachment members 40, 42, as shown in FIG. 1, are contemplated to be one-piece units made from injection molded thermal reinforced plastic. The retail cart is largely comprised of injection molded thermal reinforced plastic parts, such that the cart is lightweight, as compared to metal carts known in the art, and therefore is more easy to assemble without the need for specific tools. Given that the first and second side attachment members 40, 42 have the same overall configuration, their parts will be described using the same reference numerals for each.

The first and second side attachment members 40, 42 include an overall outer frame member comprising upper crossbars 44, lower crossbars 46, front uprights 50, and rear uprights 52. The lower crossbars 46 further comprise recesses 48 for aligning the lower crossbar 46 with the recessed area or nip 32 disposed on the upper surface 14 of the base unit 12. First and second side attachment members 40, 42 are coupled to the upper side 14 of base unit 12 in a generally upright, parallel, and laterally spaced-apart relationship. The front uprights 50 and rear uprights 52 are laterally spaced-apart with a plurality of support members 54 disposed therebetween. Support members 54 are adapted to receive shelving units 70 as further described below. Disposed on an upper portion of the forward uprights 50 and on an upper portion of the rearward uprights 52, receiving channels 56 are disposed. As shown in FIG. 1, receiving channels 56 are shown in the form of tube-like assemblies disposed on both the front and rear uprights 50, 52.

In assembly, receiving channels 56 receive a handle member 58 which, as shown in the embodiment of FIG. 1, is a substantially U-shaped handle member. Handle members 58 operably couple the first side attachment member 40 to the second side attachment member 42. Each handle member 58 has a first side 60 and a second side 62 (see FIG. 4), wherein the first side 60 is coupled to the first side attachment member 40 at receiving channel 56 and the second side 62 of the handle member 58 is coupled to the second side attachment member 42 at receiving channel 56. The first and second side attachment members 40, 42 are further connected via upper and lower stabilizers 64, 66 which connect the front uprights 50 of the first and second side attachment members 40, 42 in a removable snap-in fashion as further described below. Upper and lower stabilizers 64, 66 are further disposed between the rear uprights 52 of the first and second side attachment members 40, 42, thereby connecting the side attachment members.

Figure 2:
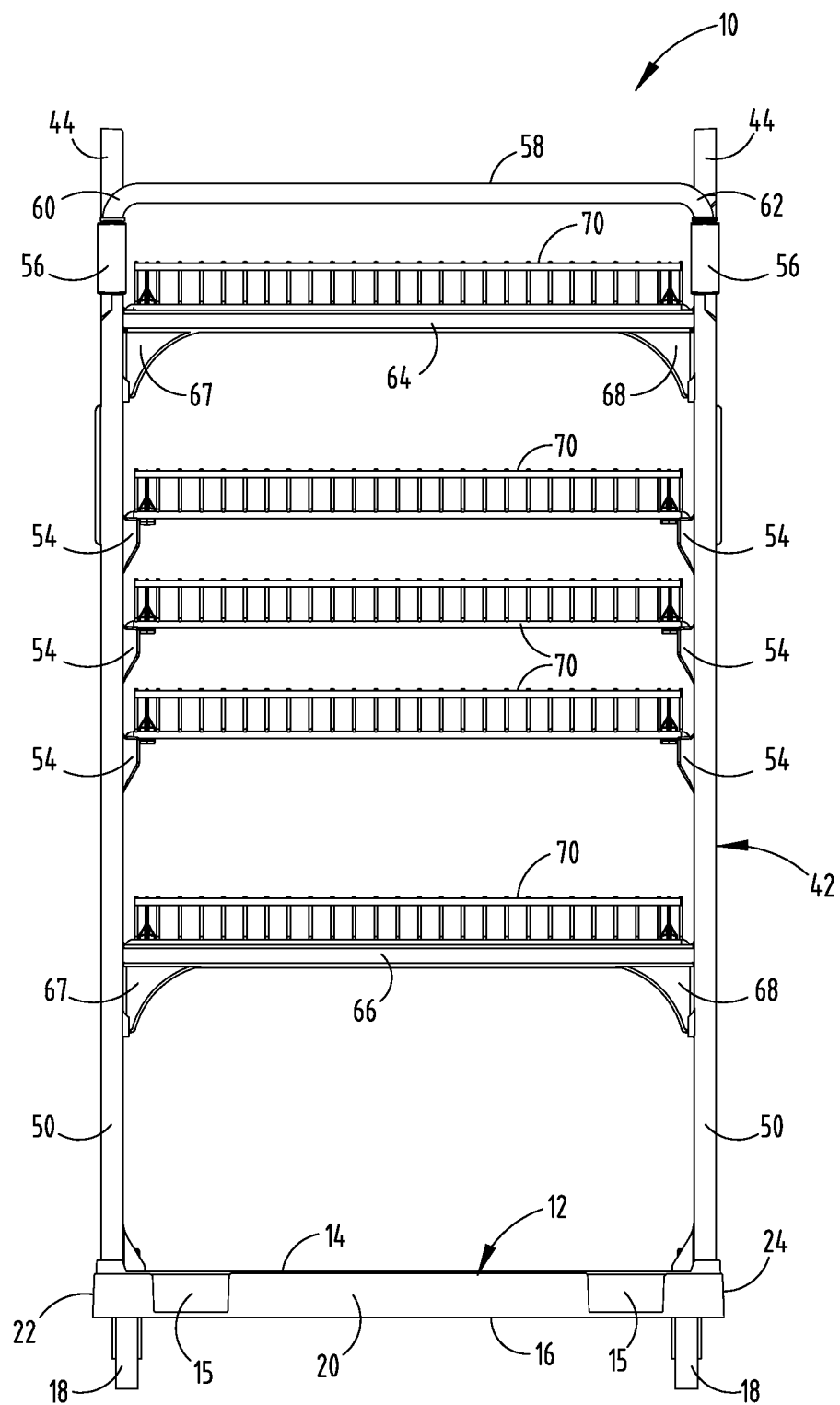
FIG. 2 is a front elevational view of the retail cart as shown in FIG. 1.

As shown in FIG. 2, the retail cart 10 has a plurality of shelving units 70 which are vertically spaced along a vertical length of the first and second side attachment members 40, 42. In the front elevational view of the retail cart 10 as shown in FIG. 2, the upper and lower stabilizers 64, 66 have first and second sides 67, 68. In this way, the upper and lower stabilizers 64, 66 form a plurality of stabilizers which are coupled to the front uprights 50 of both the first side attachment member 40 and the second side attachment member 42. Specifically, the first end 67 of the upper and lower stabilizers 64, 66 is coupled to the first side attachment member 40 and the second end 68 of the upper and lower stabilizer 64, 66 is attached to the second side attachment member 42. As noted above, the stabilizers 64, 66 are removably coupled to the first and second side attachment members 40, 42 on the front and rear uprights 50, 52. With the stabilizers 64, 66 in place, the retail cart 10 has sufficient rigidity to move and support merchandise as intended. The rigidity provided by the stabilizers 64, 66, which, for purposes of the present invention, are polymeric stabilizers, allows for the frame components of the retail cart 10 to be made of a lightweight polymeric material which decreases the overall weight of the cart without sacrificing utility and stability.

Figure 3:
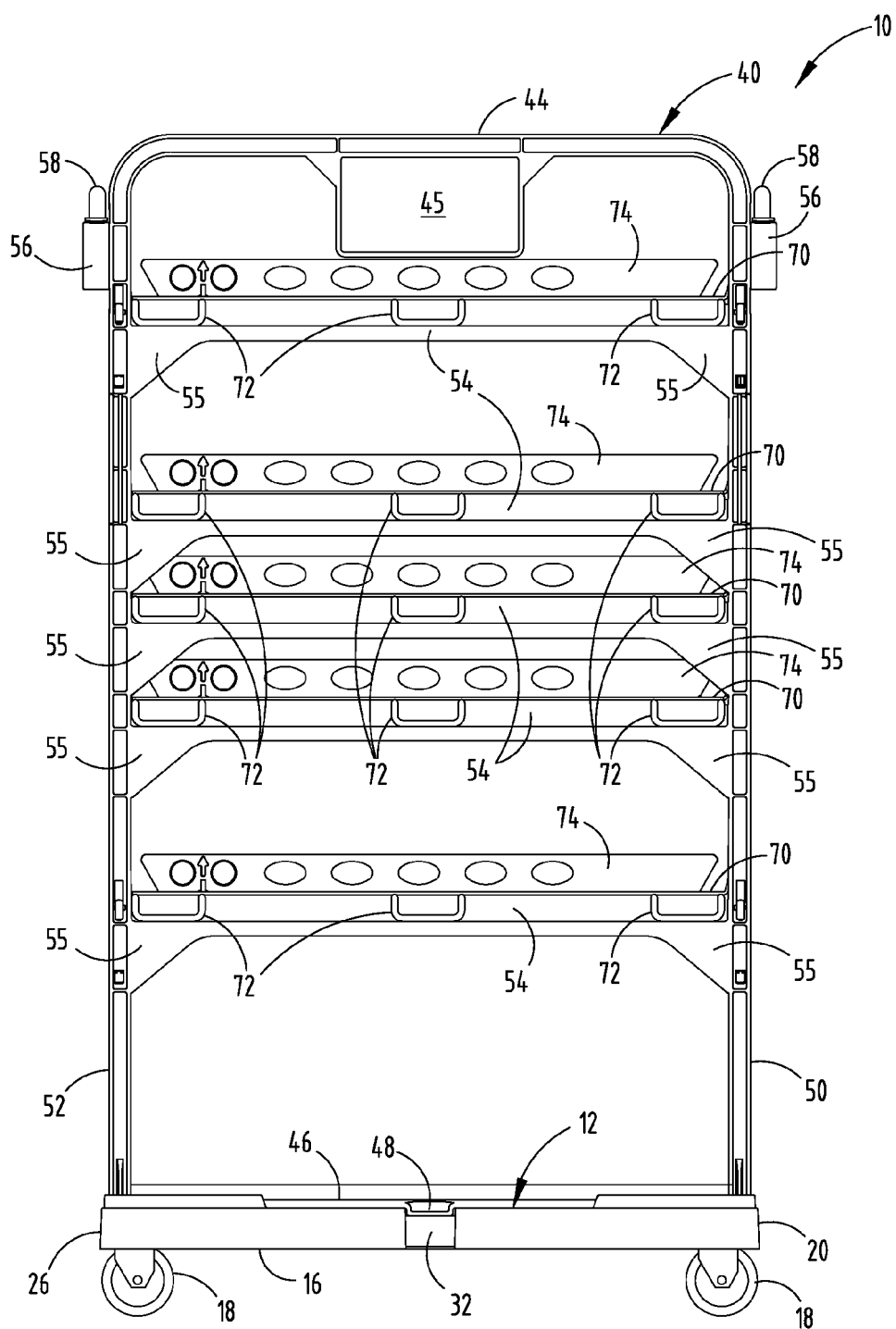
FIG. 3 is a side elevational view of a retail cart as shown in FIG. 1.

Referring now to FIG. 3, the side elevational view of the retail cart 10 shows the retail cart having the first side attachment member 40 with an upper crossbar 44 having a display area 45 attached thereto. In use, the display area can contain warning information and instructional information for proper use of retail cart 10. The retail cart 10, as shown in FIG. 3, has support members 54 which further comprise gusseted ends 55 for reinforced attachment of the support members 54 to the front and rear uprights 50, 52. The support members 54 further comprise receiving channels 110 for receiving the shelving units 70 as further describe below with reference to FIGS. 5A-5C. In the embodiment shown in FIG. 3, the retail cart 10 is shown with five support members 54 supporting five shelving units 70. It is noted that the shelving units 70 are slideably received on the support members 54 in the receiving channels 110 using, in part, shelving unit support guides 72 which are disposed along a length of the shelving units 70 as further described below in connection with FIGS. 6-8. The removable, slideably received shelving units 70 further comprise detachable dividers 74 for organizing and dividing merchandise as stocked on the shelving unit 70.

As shown in FIG. 3, the base unit 12 having a side wall 22 further comprises a recessed area 32 which matingly receives a recess 48 disposed in the lower crossbar 46 of the first side attachment member 40 for aligning the first side attachment member 40 for attachment to the base unit 12. In assembly, it is contemplated that a hand-turned locking mechanism is received in an aperture disposed on the recessed portion 48 of lower crossbar 46 and further received in the recessed area 32 of side wall 22 of base unit 12 for securely attaching the first side attachment member 40 to the base unit 12 in such a manner that tools are not required. The aperture disposed in the lower crossbar 46 in the recessed portion 48 of the side attachment member 40 is indicated as aperture 49 in FIG. 4, and the aperture disposed in the recessed portion 32 of side wall 22 of base unit 12 is identified as aperture 33 in FIG. 4.

Figure 4:
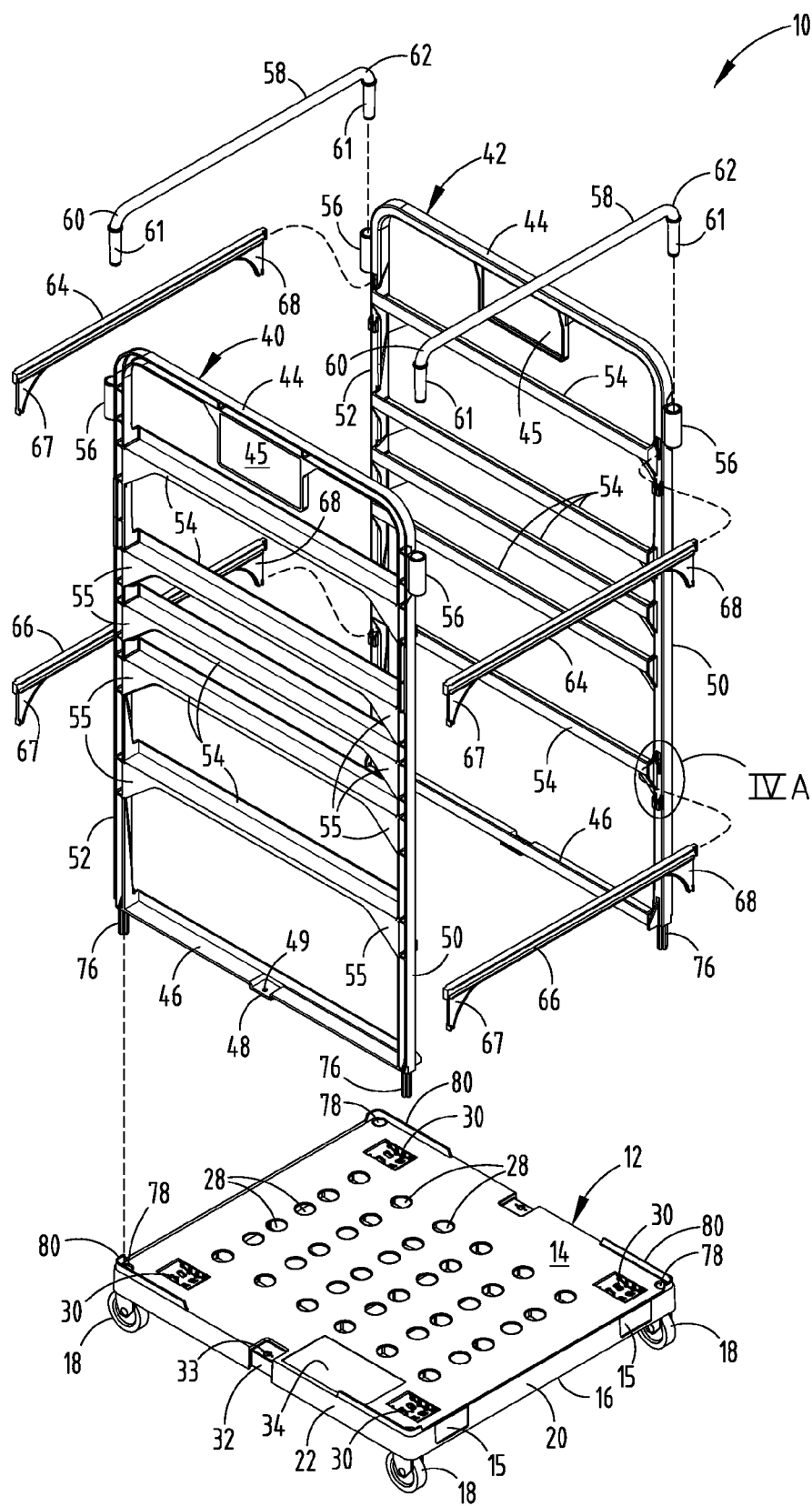
FIG. 4 is a perspective exploded view of a retail cart according to embodiments of the present invention.

Referring now to FIG. 4, the retail cart 10 is shown in an exploded view in a similar perspective orientation as shown in FIG. 1. In the embodiment shown in FIG. 4, the slideably received and removable shelving units 70 have been removed. First and second side attachment members 40, 42 have connecting members 76 disposed at the lower ends of the front and rear uprights 50, 52. In assembly and as indicated by the dotted lines in FIG. 4, the connecting members 76 are slideably and frictionally received in apertures 78 approximately disposed in the corners of the upper surface 14 of base unit 12. Upper surface 14 of base unit 12 further comprises retaining walls 80 which help guide the attachment of the first and second side attachment members 40, 42 in assembly. In this way, first and second side attachment members 40, 42 can be frictionally fit into base unit 12 by receiving the connecting members 76 into the connecting apertures 78 as guided by retainment walls 80. Near the upper portion of the front and rear uprights 50, 52 of the first and second side attachment members 40, 42, receiving channels 56, shown in the embodiment in FIG. 4 as tube-like receiving channels, are adapted to engage connecting members 61 of the first and second sides 60, 62 of the handle member 58. Thus, the first and second side members 40, 42 can be slideably, removably and frictionally coupled to the base unit 12 by the receiving of the connecting members 76 into connecting apertures 78 disposed on upper surface 14 of base unit 12.

Once a first or second side attachment member 40, 42 is received in this way on base unit 12, the first or second side attachment member 40, 42 will stand on its own in an upright orientation, such that the user assembling the retail cart 10 can fasten the first or second side attachment member using a fastener mechanism disposed in recess 48 of the lower crossbar 46 of the first or second side attachment member 40, 42. With the side attachment members 40, 42 in place, the retail cart assembler can then install the handle members 58 by slideably, removably and frictionally fitting the connecting members 61 disposed on the first and second sides 60, 62 of the handle member 58 into the receiving channels 56 disposed on the upper ends of the front and rear uprights 50, 52 of the first and second side attachment members 40, 42. With the first and second side attachment members 40, 42 operably coupled to base unit 12 on a lower end and operably coupled to each other via handle members 58 at an upper end, a basic upright rectangular structural frame is formed. The basic structural frame includes the first and second side attachment members 40, 42 being positioned in an upright, parallel, laterally spaced-apart relationship to one another as attached to the upper side 14 of base unit 12.

An outer frame structure of the side attachment members 40, 42 comprises an upper crossbar 44, a lower crossbar 46, and laterally spaced uprights 50, 52. As further shown in FIG. 4, first and second side attachment members 40, 42 further comprise a plurality of support members 54 having gusseted ends 55, wherein support members 54 are disposed between the laterally spaced front and rear uprights 50, 52 of each side attachment member 40, 42 adding support and rigidity to the retail cart.

As further shown in FIG. 4, the retail cart 10 comprises a plurality of stabilizers specifically identified as upper and lower stabilizers 64, 66. The upper and lower stabilizers 64, 66 are operably coupled to the first side attachment member 40 at a first end 67 and operably coupled to the second side attachment member 42 at a second end 68. In the embodiment shown in FIG. 4, upper stabilizers 64 and lower stabilizers 66 are connected to the front and rear uprights 50, 52 of both the first and second side attachment members 40, 42, thus, coupling the first and second side attachment members 40, 42 in a manner similar to the coupling of the side attachment members 40, 42 by handle members 58. The stabilizers further increase the rigidity of the polymeric structure of the retail cart 10. The upper and lower stabilizers 64, 66 are generally of the same configuration and are removably coupled to the front and rear uprights 50, 52 of the first and second side attachment members 40, 42, as further described with reference to FIGS. 4A and 4B.

Figure 4A:
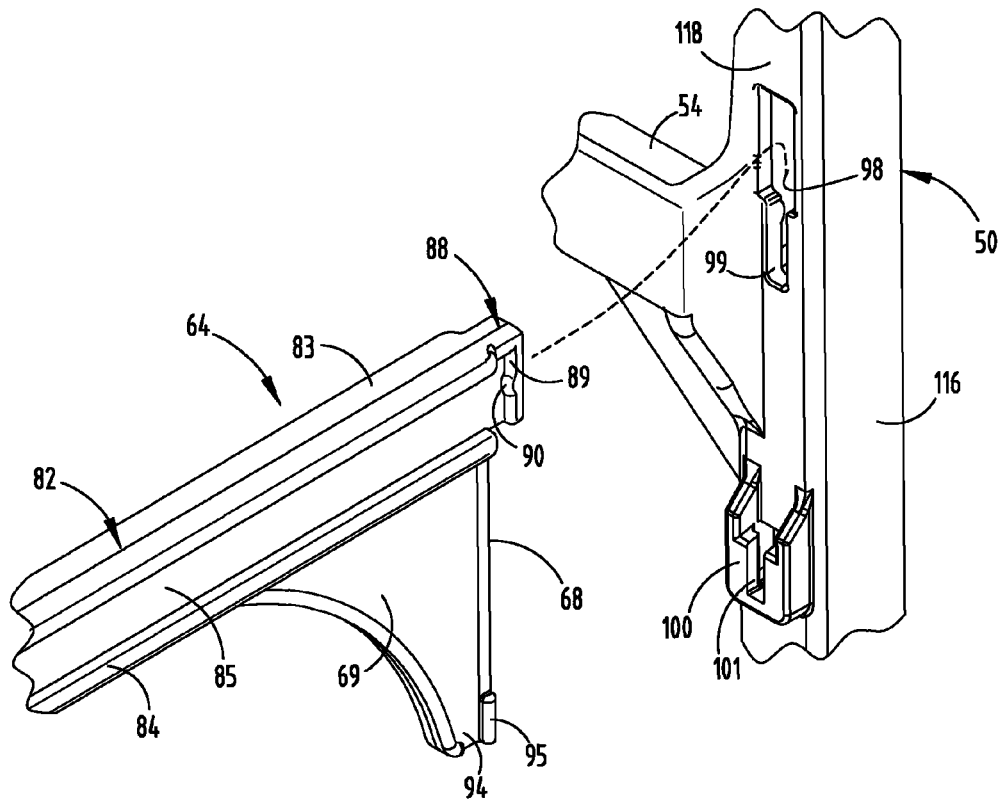
FIG. 4A is fragmentary perspective views of a stabilizer and an upright of the present invention.
Figure 4B:
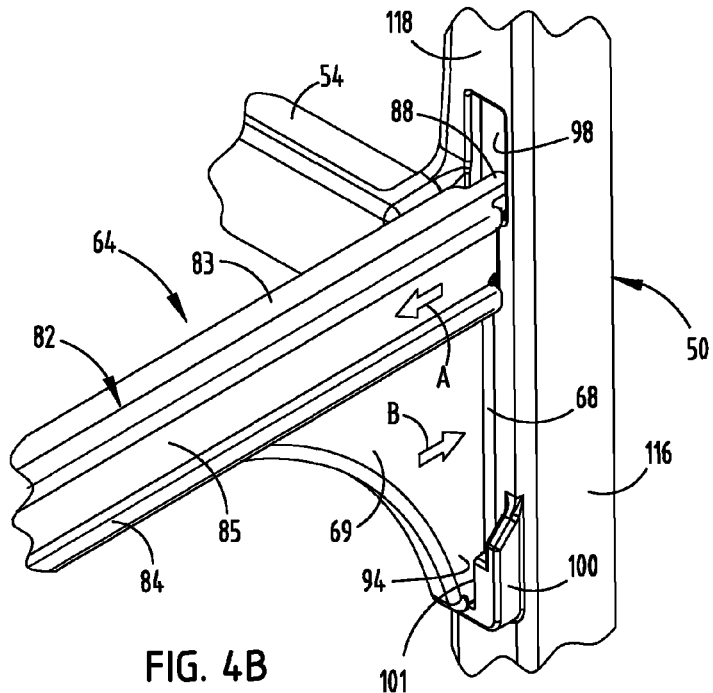
FIG. 4B is fragmentary perspective views of a stabilizer and an upright of the present invention.

Referring now to FIGS. 4A and 4B, a stabilizer, indicated here as an upper stabilizer 64 but which may also be a lower stabilizer 66, is shown as connected to an upright, which in FIGS. 4A and 4B is shown as a front upright 50, of either a first or second side attachment member 40, 42. As shown in FIG. 4A, the stabilizer 64 comprises an upper crossbar 82 which has a generally I-beam configuration comprised of a top wall 83, a bottom wall 84, and a middle section 85 connecting the top wall 83 and bottom wall 84. At a second end 68 of the stabilizer 64, a gusset 69 is disposed extending off the bottom wall 84 of the top crossbar 82. In assembly, the gusset 69 lends support and rigidity to the stabilizer 64. Disposed at a distal end of the top crossbar 82, a snap-fit attachment flange 88 is disposed. The snap-fit attachment flange 88 comprises a retaining member 89 having a biasing member 90 disposed thereon. Disposed at a lower end of the gusset 69 is a lower attachment flange 94 having a retainment member 95. Thus, the stabilizer 64 has upper and lower attachment flange 88, 94 disposed on either side 67, 68 of the stabilizer 64. In assembly, the stabilizer 64 is attached to a connecting wall 118 of an upright, such as upright 50 shown in FIGS. 4A and 4B, through a receiving aperture 98 and a receiving cradle 100. The upright-receiving aperture 98 narrows to a channel 99, such that, as the snap-fit attachment flange 88 is inserted into the upright-receiving aperture 98, the assembler of the retail cart will press downward vertically on the upper crossbar 82 of stabilizer 64 to create a snap-fit engagement of the snap-fit attachment flange 88 within the channel 99 of the upright-receiving aperture 98. In this way, the middle portion 85 of crossbar 82 having an I-beam configuration is retained within the channel 99 of upright-receiving aperture 98. The retainment member 89 of the snap-fit attachment flange 88 further retains the stabilizer 64 in the snap-fit engagement, as shown in FIG. 4B and further shown in FIG. 5A.

The biasing member 90 disposed on the retaining member 89 further increases the force and frictional fit of the stabilizer as attached to upright 50 to ensure a solid retention. The snap-fit attachment flange 88 is received in the upright-receiving aperture 98 as indicated by the dotted lines in FIG. 4A. As the stabilizer 64 is pushed downward to create the snap-fit engagement, the lower attachment flange 94 of the stabilizer 64 is received in the upright receiving cradle 100, which further comprises a channel 101 which is engaged by the retainment member 95 of the lower attachment flange 94. In this way, the stabilizer 64 creates counteracting forces indicated by arrows A and B. As shown in FIG. 4B, force A is created by the engagement of the snap-fit attachment flange 88 to the channel 99 of the upright-receiving aperture 98, and, more specifically, by forces created by the biasing member 90 of the snap-fit attachment flange 88 acting on the interior structure of the upright 50. Opposing forces, as indicated by arrow B, are imparted on the upright 50 by the engagement of the lower attachment flange 94 to the upright-receiving cradle 100. In this way, the stabilizers 64 provide solid support to upright 50 and are positively captured thereon to provide rigidity to the overall structure of the retail cart.

Much like the first and second side attachment members 40, 42, the handle members 58 and the stabilizers 64, 66 are comprised of an injection molded thermal reinforced plastic. The handle members 58 and the stabilizers 64, 66 are not side specific much like the first and second side attachment members 40, 42. Thus, any stabilizer can be used at the upper or lower stabilizer attachment location and any handle member can be attached to the cart at a tube-like receiving channel 56 as shown in FIG. 4. Having polymeric parts that are not right, left, front or rear specific aids in the ease of assembly of the cart.

Figure 5:
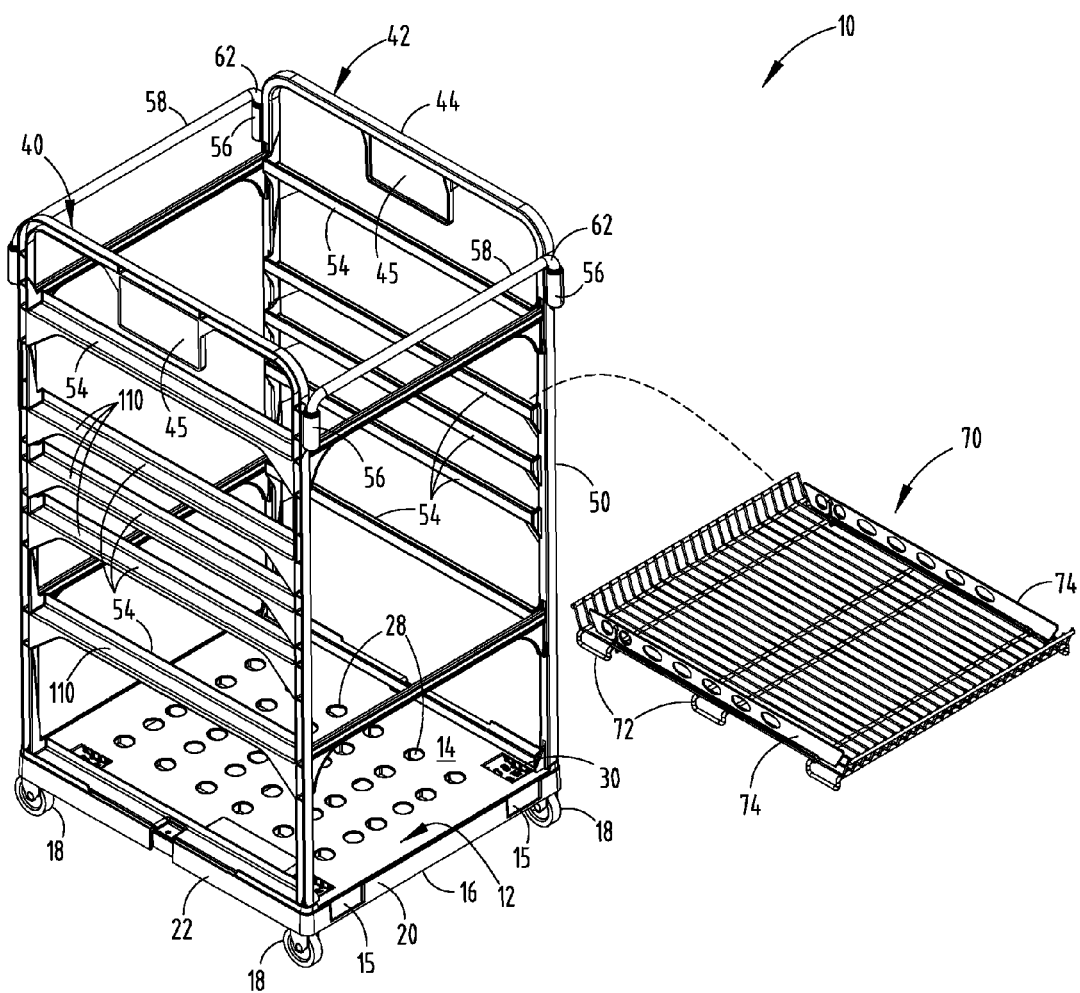
FIG. 5 is a perspective view of a retail cart and a shelving unit of the present invention.

Referring now to FIG. 5, a retail cart 10 is shown with a shelving unit 70 removed therefrom. Shelving unit 70 is slideably received on any one of the plurality of support members 54 at various vertical locations. Specifically, the shelving unit 70 is received at shelf-receiving channels 110 disposed on the support members 54 and as further shown in FIGS. 5A-5C.

Referring to FIG. 5A, the shelf-receiving channels 110 essentially comprise an L-shaped configuration having an upright vertical wall 112 and a horizontal landing wall 114. The shelving unit support guides 72 are slideably received and engaged with the shelf-receiving channels 110 of the support members 54. As further shown in FIG. 5A, the uprights of the first and second side attachment members, exemplified by front upright 50 shown in FIG. 5A, have a generally U-shaped configuration with first and second side walls 116, 117 with a connecting wall 118 connecting the first and second side walls 116, 117. In this way, the side walls 116, 117 and connecting wall 118 create a U-shaped configuration of the upright 50 having a channel 120 disposed along a length of the upright. A plurality of reinforcement members 122 are disposed along a length of the upright 50 connecting to side walls 116, 117 and connecting wall 118 to provide rigidity and support to the upright 50.

As shown in the embodiment in FIG. 5B, a vertical reinforcement member 123 is disposed in the channel 120 to further provide rigidity to the upright 50. As shown in FIG. 5C, a shelving unit 70 is shown disposed and slideably received in a shelf-receiving channel 110 of a support member 54 by engagement of the shelving unit support guides 72. In assembly, it is contemplated that the shelving unit 70 can be fully removed from the retail cart 10, as shown in FIG. 5, or fully received in the retail cart 10, as shown in FIG. 1. The shelving units 70 can also be partially removed from the retail cart 10 as necessary for use by the retail cart user.

Figure 6:
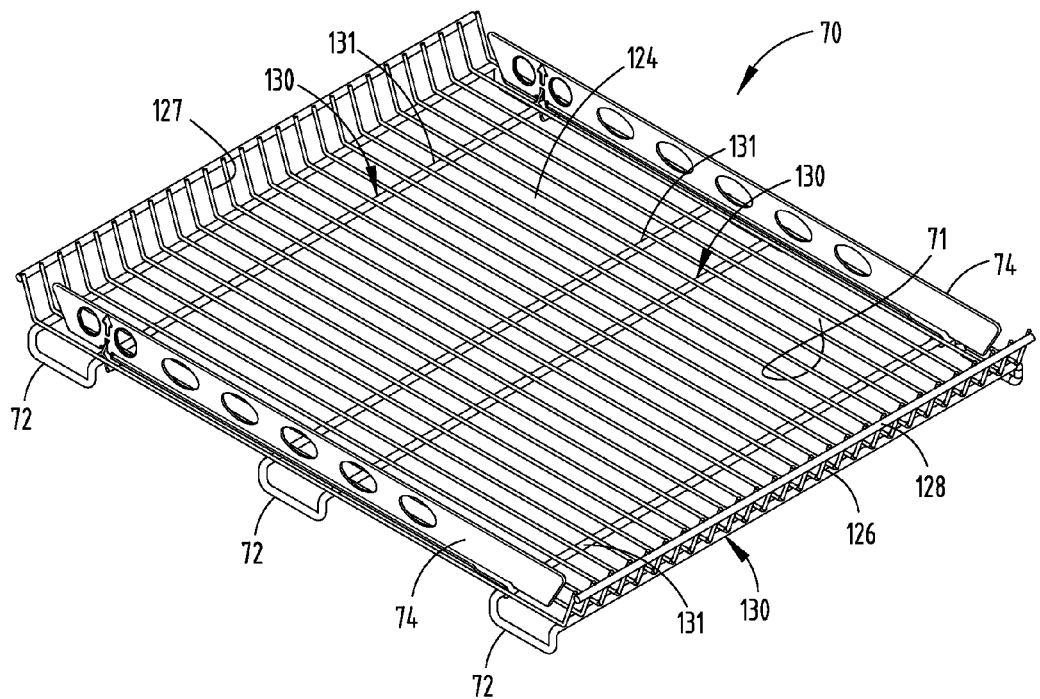
FIG. 6 is a perspective view of a shelving unit.
Figure 7:
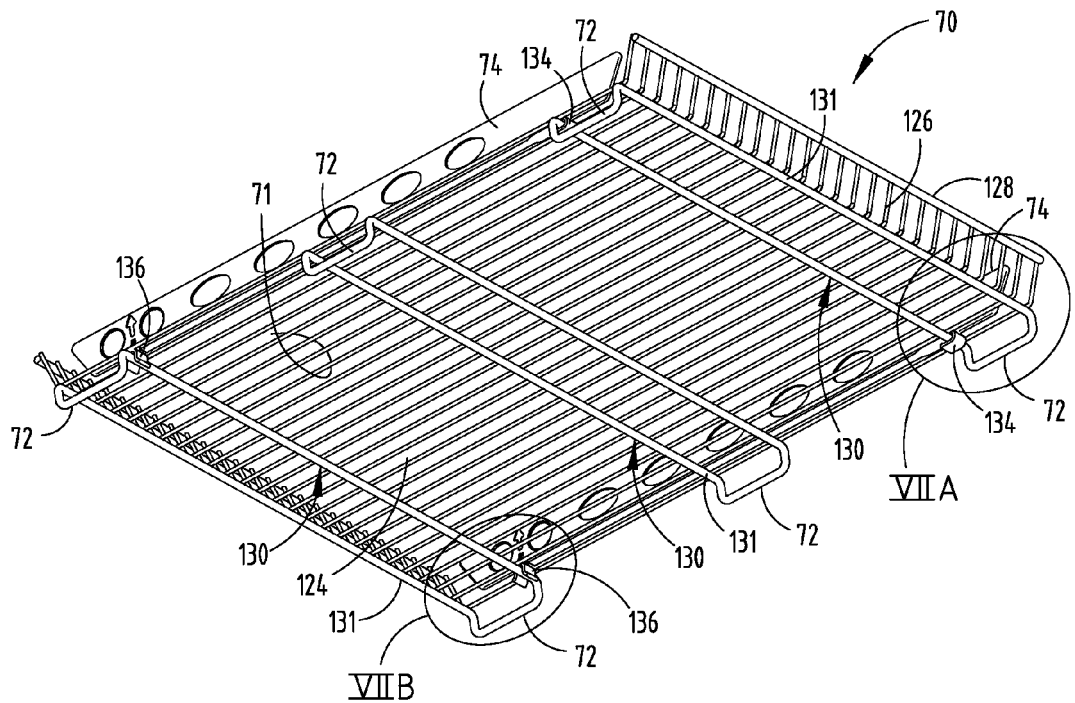
FIG. 7 is a perspective view of a shelving unit.

Referring now to FIGS. 6 and 7, a shelving unit 70 is shown removed from the retail cart. Shelving units 70 are contemplated to be wire shelving units having a series of parallel spaced-apart wire members 71. The wire members 71 create a landing area 124 for receiving items to be stored on the retail cart. The shelving units 70 further comprise front and rear retaining walls 126, 127 which, in the embodiment shown in FIGS. 6 and 7, are comprised of bends in the wire members 71 culminating in a top or upper crossbar 128. The bends in the wire members 71 are strategically placed such that the landing areas 124 of the shelving units 70 are maximized with respect to the cart configuration. In this way, the shelving units 70 do not waste space used to store items. Attached to an underside of the landing area 124 are essentially rectangularly shaped supports 130 which connect to wire members 71. The rectangular shaped support members 130 culminate at either end in the shelving unit support guides 72 which are created by bending the support members 130 in assembly. Therefore, the support members 130 have horizontal support rails 131 attached to the wire members 71, and vertical shelving unit support guides 72, which slideably engage support members 54 at receiving channels 110 in assembly.

As shown in FIG. 8, removable polymeric dividers 74 are removed from a shelving unit 70 and can be placed anywhere along the landing area 124 of the shelving unit 70 for dividing merchandise and other items as stored on shelving unit 70. As shown in FIGS. 7A and 7B, the dividers 74 comprise clips for retaining the dividers 74 along the landing area 124 of shelving unit 70. Specifically, the dividers 74 comprise front clips 134 and rearward clips 136 disposed on the bottom of the dividers 74 for engagement of the horizontal bars 131 of the support members 130. In assembly, the front clips 134 of the dividers 74 are laterally opening clips which are attached to a horizontal bar 131 of support members 130, as shown in FIG. 7A. Once the front clip 134 of divider 74 is secured to horizontal support bar 131 of a first support member 130, the divider 74 is rotated downward for engagement of the rearward clip 136, which is a horizontally opening clip, to a horizontal bar 131 of a second support member 130 disposed on the shelving unit 70. In this way, the dividers 74 remain removably attached to the shelving unit 70, as shown in FIG. 6, and can be placed as needed along the landing area 124 of the shelving unit 70 for organizing and storing merchandise.

Figure 9:
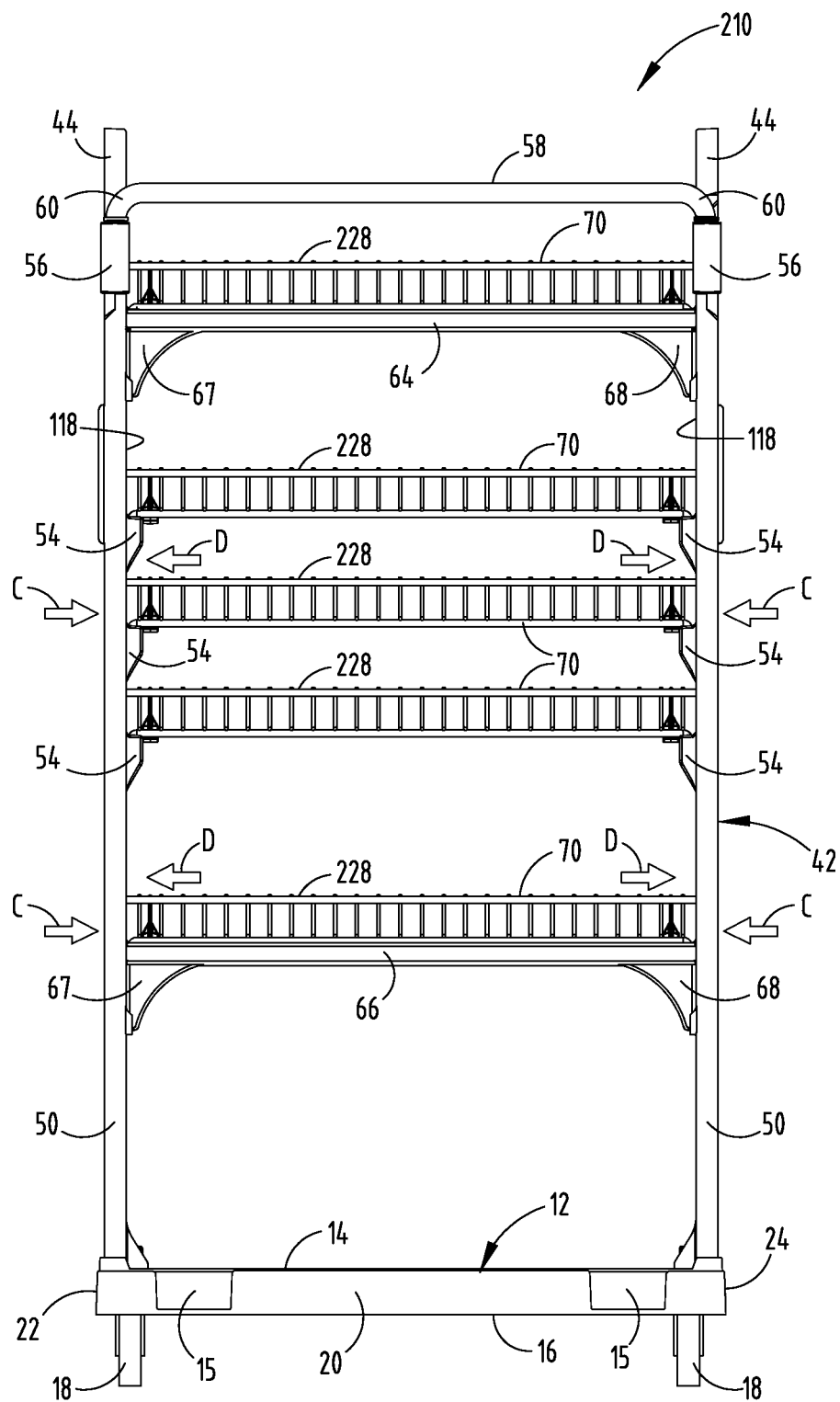
FIG. 9 is a front elevational view of a retail cart according to another embodiment of the present invention.

Referring now to FIG. 9, another embodiment of a retail cart 210 is shown having essentially the same characteristics and features as found on the retail cart 10 shown in FIG. 2. In the embodiment shown in FIG. 9, the shelving units 70 have a top crossbar 228 which contacts the first and second side attachment members 40, 42 when the shelving unit 70 is fully stowed within the retail cart 210. This contact creates a lateral outwardly force indicated by arrows D on the first and second side attachment members 40, 42. As further shown in FIG. 9A, the top crossbar 228 extends to contact connecting wall 118 of the upright 50, such that opposing forces are created as indicated by arrows C and D. A first force is created by the shelving assembly 70, as indicated by arrow D, due to the top crossbar 228 acting on the connection wall 118 of the upright 50 as described above. Further, an opposing force, as indicated by arrow C, is exerted upon the shelf-receiving channel 110 of the support member 54 by the interaction of the shelving unit support guide 72 acting on the vertical wall 112 of the shelf-receiving channel 110. In this way, as the shelving units 70 are fully stowed within the retail cart 210, the shelving units 70 lend support and rigidity to the overall retail cart assembly by the interaction of the opposing forces C and D as shown in FIG. 9. It is noted that the opposing forces C and D act on both side attachment members 40, 42 at both the front and rear uprights 50, 52 in assembly.

Figure 10:
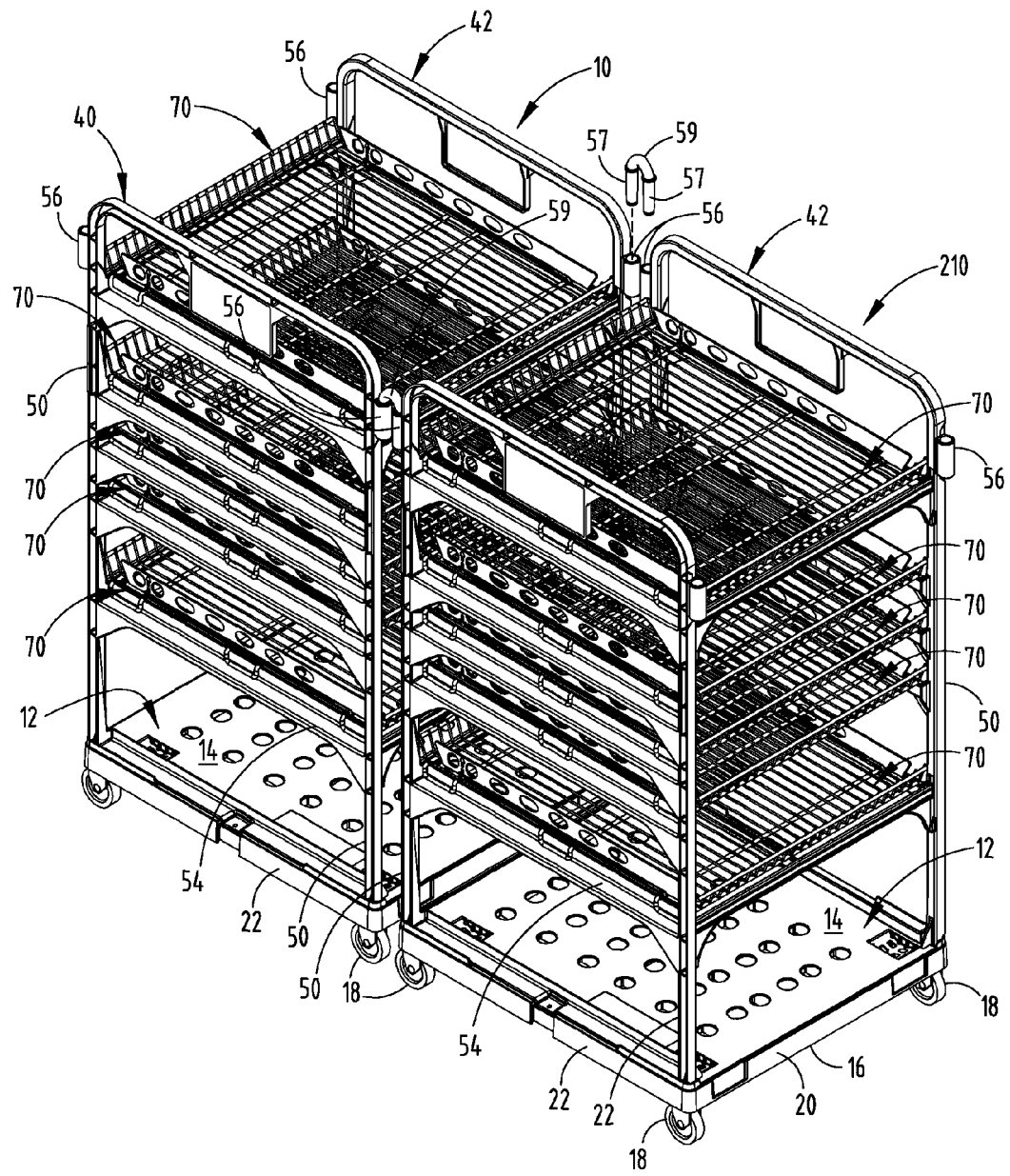
FIG. 10 is a perspective view of two retail carts linked together with connecting brackets.

Referring now to FIG. 10, a retail cart 10 is shown as coupled to a second retail cart 210. The carts 10, 210 are operably coupled to one another using U-shaped connecting bracket 59 having connecting members 57 which operably engage receiving channels 56 disposed on the upper ends of the first and second side attachment members 40, 42 of both carts 10 and 210. Thus, any number of retail carts can be linked together using brackets 59. In assembly, a cart 10 can be linked to a second cart 210 by removing the handle member 58 and installing a U-shaped bracket 59. It is contemplated that a chain of carts can be easily maneuvered by installing mobile transport rollers 18 on the base unit 12 of adjacent carts, with swivel casters disposed on the distal ends of carts at the beginning and end of the chain of carts.

Figure 9A:
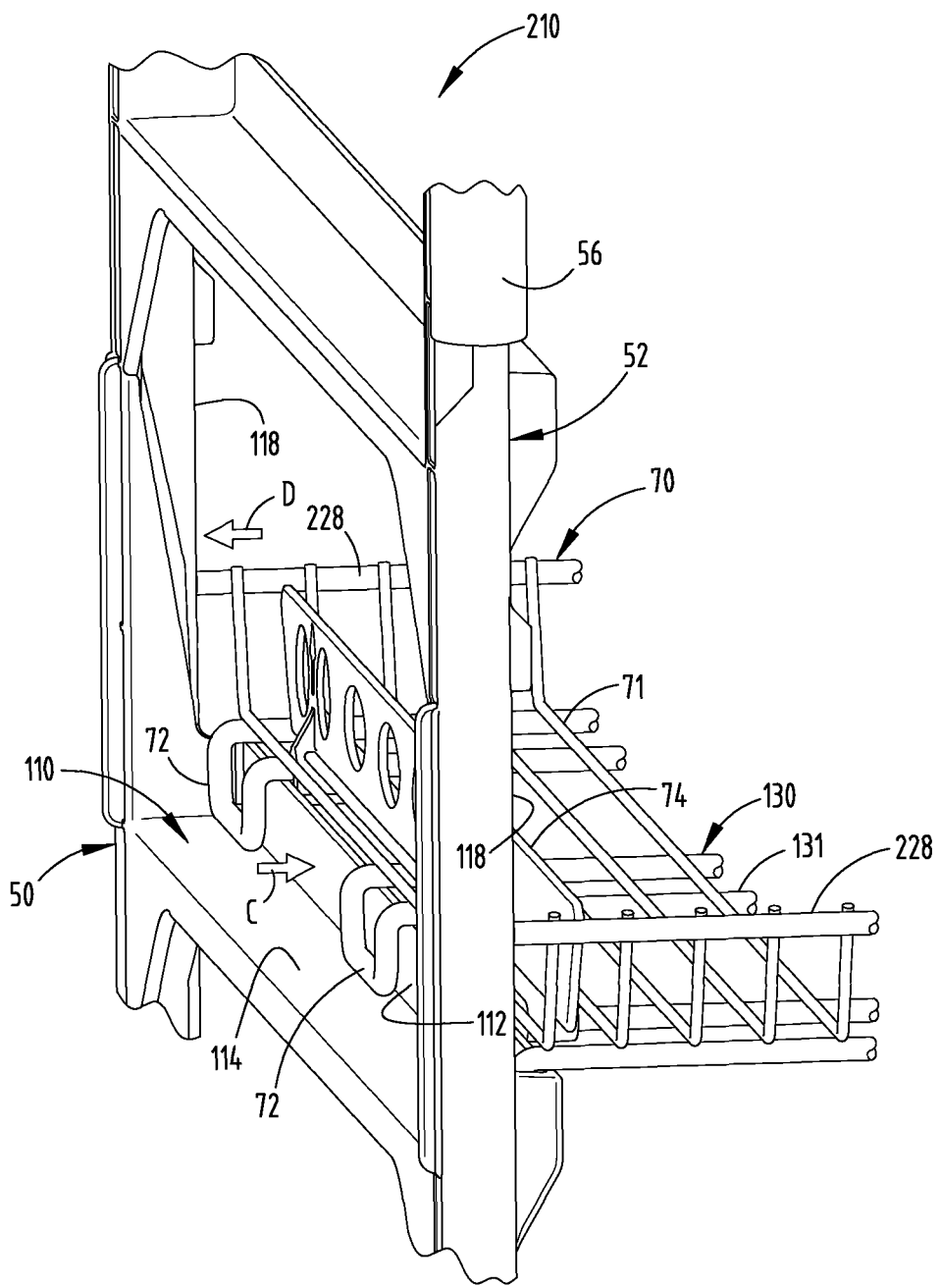
FIG. 9A is a fragmentary perspective view of the shelving unit and side attachment member.

Referring now to FIGS. 4A and 4B, it has been surprisingly discovered that the engagement of the stabilizers 64, 66 to the first and second side attachment members 40, 42 using the upper and lower attachment mechanisms 88, 94 disposed on both the first and second ends 67, 68 of the stabilizers 64, 66 creates rigid engagement due to the opposing forces A and B (FIG. 4A). The upper attachment mechanisms 88 impart a first lateral force A on an associated upright, and the lower attachment mechanisms 94 impart a second lateral force B in opposition to the first force A on the associated upright 50. Further, it has been surprisingly discovered that the shelving units 70, as shown in FIGS. 9 and 9A, also create opposing lateral forces C and D by the interaction of the top crossbars 228 of the shelving unit 70 connecting with connecting wall 118 of the upright 50 to create a first force D, and the shelving unit supports 72 imparting a second lateral force C on the shelf receiving channels 110 in an opposing direction relative to the first lateral force D when the shelving unit 70 is in a stowed position on the cart. With the interaction of the shelving units 70 with the first and second side attachment members 40, 42, the shelving units 70 add rigidity to the overall cart structure simply by being stowed thereon. Further, rigidity is added as the shelving units are stocked with merchandise. Thus, the shelving units 70 are positively captured between the uprights of the first and second side attachment members 40, 42, yet are easily removed and slideable when the cart user desires.

Figure 11:
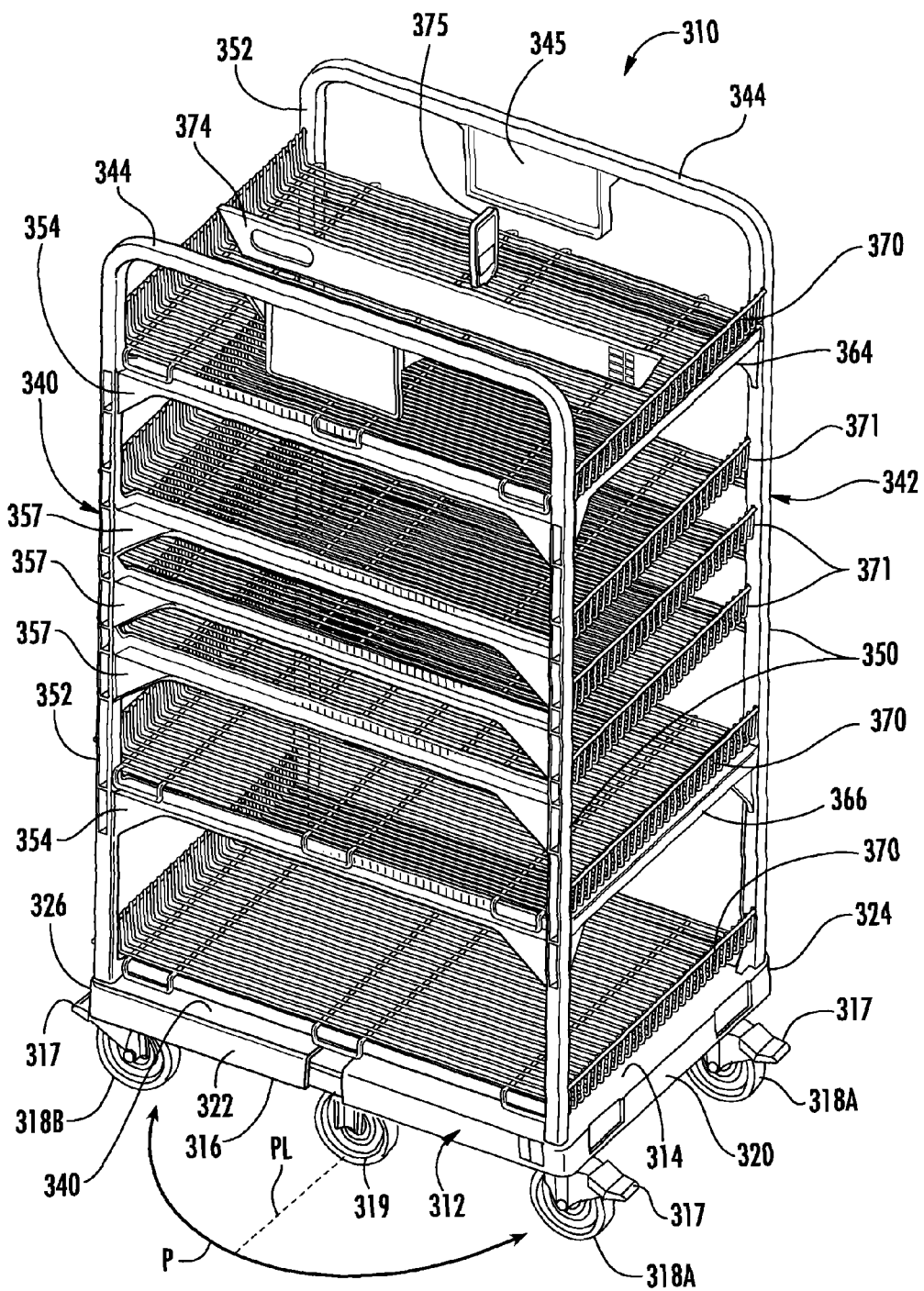
FIG. 11 is a perspective view of a retail cart according to another embodiment of the present invention.
Figure 14:
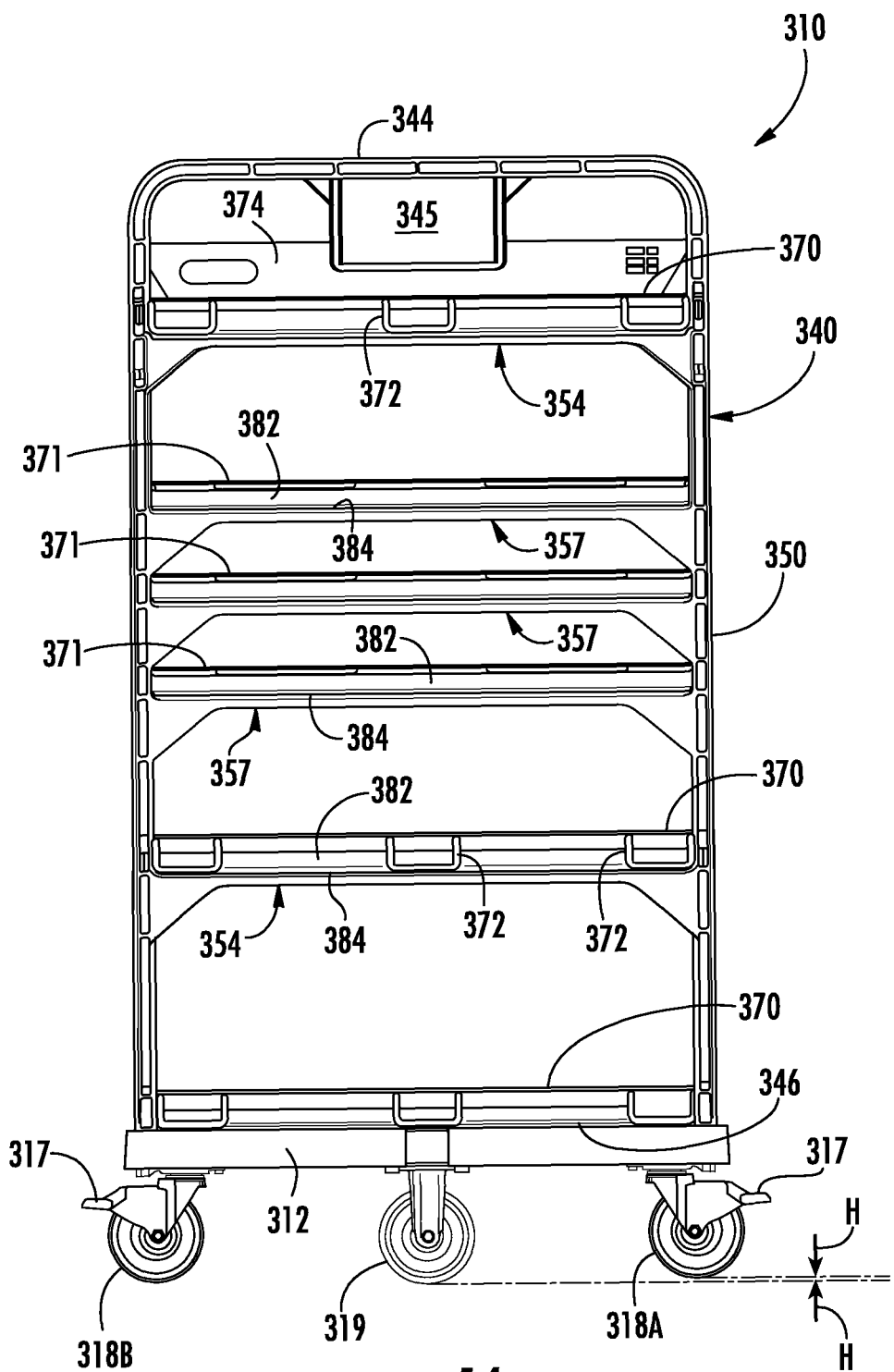
FIG. 14 is a side elevational view of the retail cart as shown in FIG. 11.

Referring now to FIG. 11, the reference numeral 310 generally designates a retail cart according to another embodiment of the present invention. The retail cart 310 includes a base unit 312 having an upper surface 314 and a lower surface 316. As shown in FIG. 11, the base unit 312 has a plurality of mobile transport rollers 318A, 318B and 319 operably coupled to the underside or lower surface 316 of the base unit 312. In the embodiment shown in FIG. 11, the mobile transport rollers 318A, 318B are in the form of dual swivel caster sets disposed at front and rear ends of the base unit 312. In the embodiment shown in FIG. 11, the casters 318A, 318B further include brake assemblies 317 for retaining the retail cart 310 in place as necessary. Mobile transport rollers 319 are in the form of rigid or fixed casters disposed in a generally central location between rollers 318A and 318B. In this configuration, the mobile transport rollers 319 serve as pivot casters for pivoting the retail cart 310 on center. The pivoting of the retail cart 310 is facilitated by mobile transport rollers 319 being offset with respect to mobile transport rollers 318A, 318B. This offset is best shown in FIG. 14 as indicated by arrows H. Thus, as shown in FIG. 14, the mobile transport rollers 319 are configured to extend downwardly from the lower surface 316 of the base unit 312 to a greater degree as compared to rollers 318A and 318B. In this way, rollers 319 are designed to remain in contact with a floor surface at all times in use. The retail cart 310 may be tilted, such that front swivel casters 318A or rear swivel casters 318B are also in contact with a floor surface along with mobile transport rollers 319. In the configuration shown in FIG. 14, the front swivel casters 318A and the rear swivel casters 318B will not contact the floor surface at the same time in use. In this way, the retail cart 310 is adapted to readily pivot in a direction as indicated by arrow P shown in FIG. 11, along a central pivot line PL. The extension of mobile transport rollers 319, as compared to rollers 31A, 31B is due to a spacer further described below. As the load increases on the retail cart 310, it is contemplated that casters 318A, 318B could contact the floor surface at the same time, however, the amount of pressure on casters 319, the pivoting casters, will always be greater than the pressure or load realized on caster 318A or 318B when a uniform load is supported on the retail cart 310. The constant contact and fixed nature of casters 319 helps to move the cart 310 in a straight path in use. The brake features 317, as shown in FIG. 11, are optional features for the casters 318A and 318B. With the caster configuration, as shown in FIG. 11, the retail cart 310 is adapted to pivot in a 360° manner as indicated by arrow P. This is in contrast to the retail cart shown in FIG. 1, wherein the cart can roll around in a 360° nature, but is not adapted to actively pivot on center every time when a user wishes to rotate the cart in a direction as indicated by arrow P.

Figure 20B:
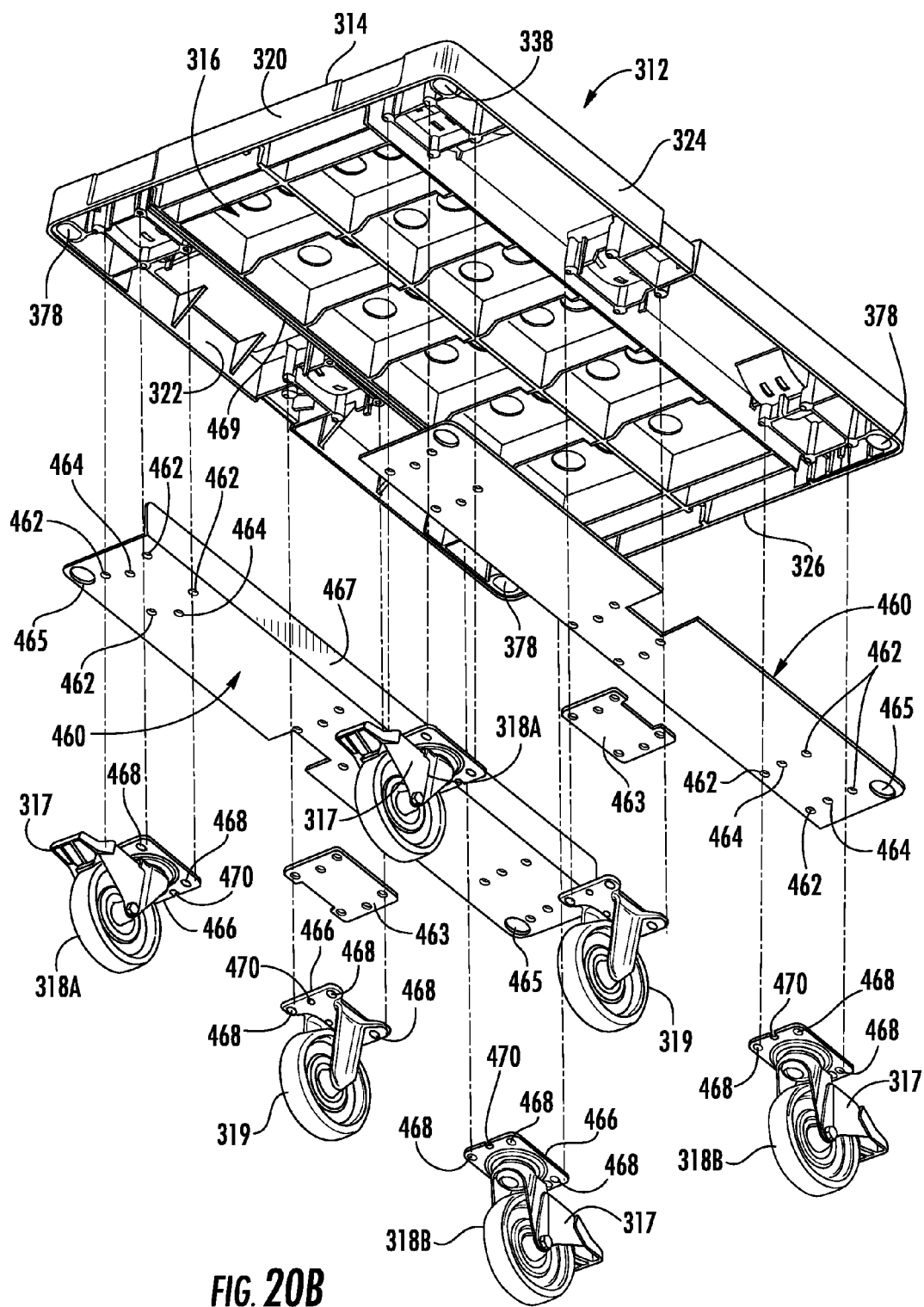
FIG. 20B is an exploded perspective view of the base unit of FIG. 20A.
Figure 20C:
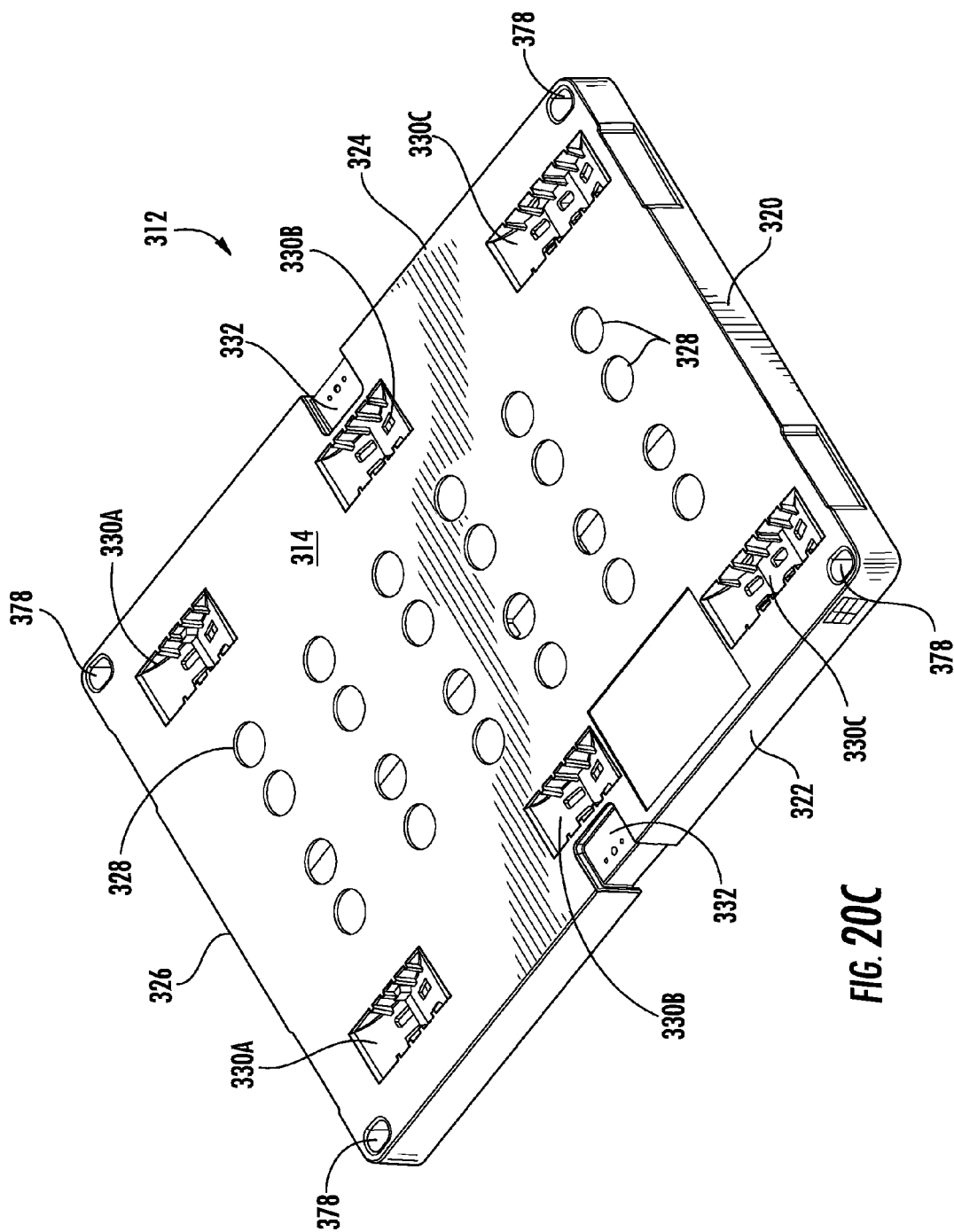
FIG. 20C is a top perspective view of the base unit of FIG. 20A.

The base unit 312 comprises a front wall 320, first and second side walls 322, 324, and a rear wall 326, giving the base unit 312 an overall rectangular configuration similar to base unit 12 disposed on retail cart 10 discussed above with reference to FIG. 1. The upper surface 314 defines a landing area having a plurality of apertures 328 disposed thereon, as best shown in FIG. 20C. The upper surface 314 of the base unit 312 may also comprise roller detents 330 (FIG. 20C) similar to detents 30 disposed in the four corners of the upper surface 14 as shown in FIG. 1. Such detents are configured to house mobile transport rollers of an additional base unit when one base unit is stacked upon another. Much like base unit 12 described above, base unit 312 is comprised of a polymeric material having internal structural reinforcements 315 disposed between the upper and lower surfaces 314, 316 as shown in FIGS. 20A-20C.

The retail cart 310 of FIG. 11 further comprises first and second side attachment members 340, 342 which essentially create an overall frame structure for the retail cart 310. The first and second side attachment members 340, 342 are operably coupled to the base unit 312 in a similar manner as compared to attachment members 40, 42 disposed on retail cart 10 described above with reference to FIG. 1. Also, like side attachment members 40, 42, the side attachment members 340, 342 are not designated for a specific attachment location on the base unit 12 and are therefore non-handed or interchangeable on the base unit for ease in assembly. The first and second side attachment members 340, 342, as shown in FIG. 11 are contemplated to be one-piece units made from injection molded thermal reinforced plastic, wherein the plastic may include a glass reinforcing element incorporated therein.

The first and second side attachment members 340, 342 include an overall outer frame member comprising upper crossbars 344, lower crossbars 346, front uprights 350, and rear uprights 352. First and second side attachment members 340, 342 are coupled to the upper side 314 of base unit 312 in a generally upright, parallel, and laterally spaced-apart relationship. The front uprights 350 and rear uprights 352 are laterally spaced-apart with a plurality of support members 354 and 357 disposed therebetween. Support members 354 are specifically adapted to receive shelving units 370, while support members 357 are adapted to receive shelving units 370 or 371 as further described below.

The first and second side attachment members 340, 342 are further connected via upper and lower stabilizers 364, 366 which connect the front uprights 350 of the first and second side attachment members 340, 342 in a removable snap-in fashion as further described below. Upper and lower stabilizers 364, 366 are further disposed between the rear uprights 352 of the first and second side attachment members 340, 342, thereby connecting the side attachment members 340, 342. The stabilizers 364, 366 are removably coupled to the first and second side attachment members 340, 342 on the front and rear uprights 350, 352. With the stabilizers 364, 366 in place, the retail cart 310 has sufficient rigidity to move and support merchandise as intended. The rigidity provided by the stabilizers 364, 366, which, for purposes of the present invention, are polymeric stabilizers, allows for the frame components of the retail cart 310 to be made of a lightweight polymeric material which decreases the overall weight of the cart 310 without sacrificing utility and stability. Stabilizers 364, 366 operate much like stabilizers 64 and 66 of retail cart 10 discussed above with reference to FIGS. 4A and 4B. Stabilizers 364, 366 also couple to the first and second side attachment members 340, 342 with opposing forces similar to forces A and B described above with reference to FIGS. 4A and 4B. The tension created by the opposing forces A and B help to further stabilize the cart 310.

Figure 12:
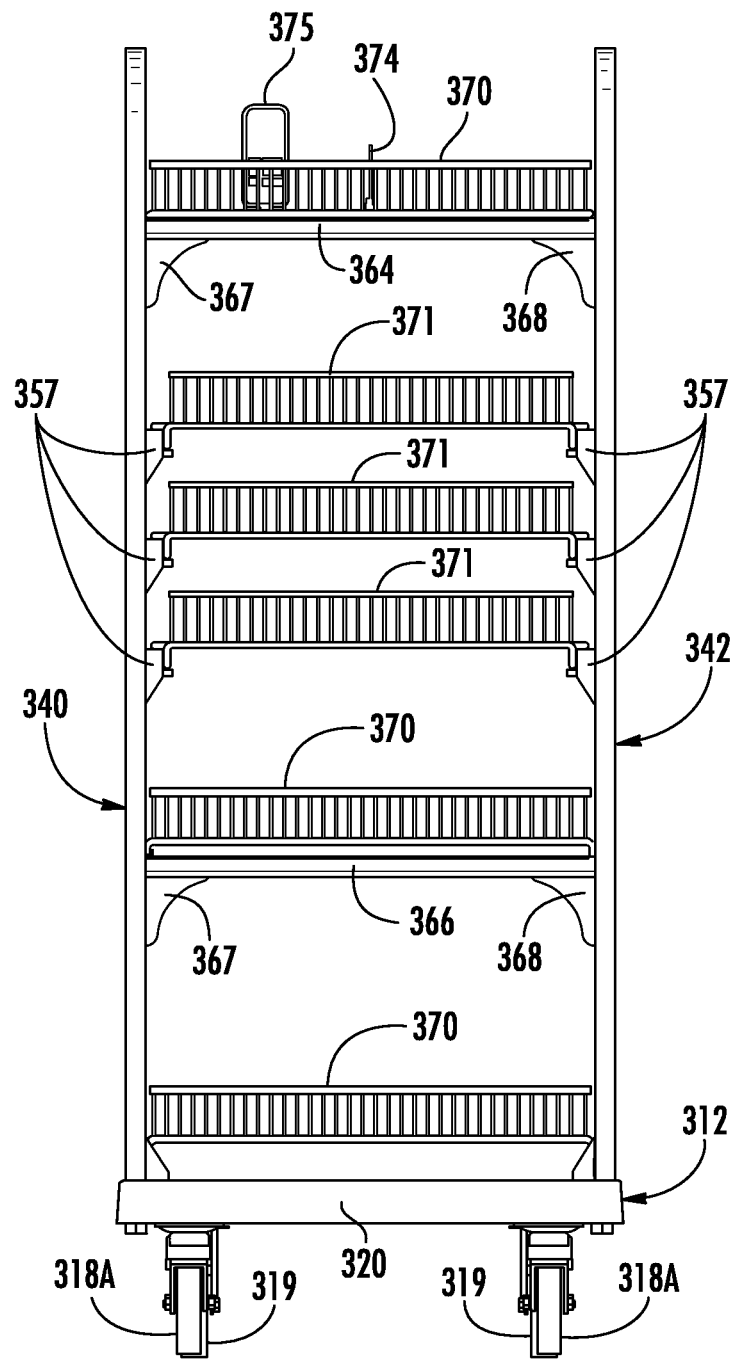
FIG. 12 is a front elevational view of a retail cart as shown in FIG. 11.

Referring now to FIG. 12, the retail cart 310 has a plurality of shelving units 370 which are vertically spaced along a vertical length of the first and second side attachment members 340, 342. The retail cart 310 further includes a plurality of shelving units 371 which are also vertically spaced along the first and second side attachment members 340, 342. In the front elevational view of the retail cart 310 as shown in FIG. 12, the upper and lower stabilizers 364, 366 have first and second gusseted ends 367, 368, which function much like ends or sides 67, 68 of retail cart 10 discussed above with reference to FIG. 2. In this way, the stabilizers 364, 366 removably couple the first and second side attachment members 340, 342 at the front and rear uprights 350, 352 of each side attachment member 340, 342. The removable, slideably received shelving units 370 and 371 further comprise detachable dividers 374 and separators 375 for organizing and dividing merchandise as stocked on the shelving units 370, 371. The dividers and separators 374, 375 are selectively positionable on the wire shelving units 370, 371 as further described below.

Figure 13A:
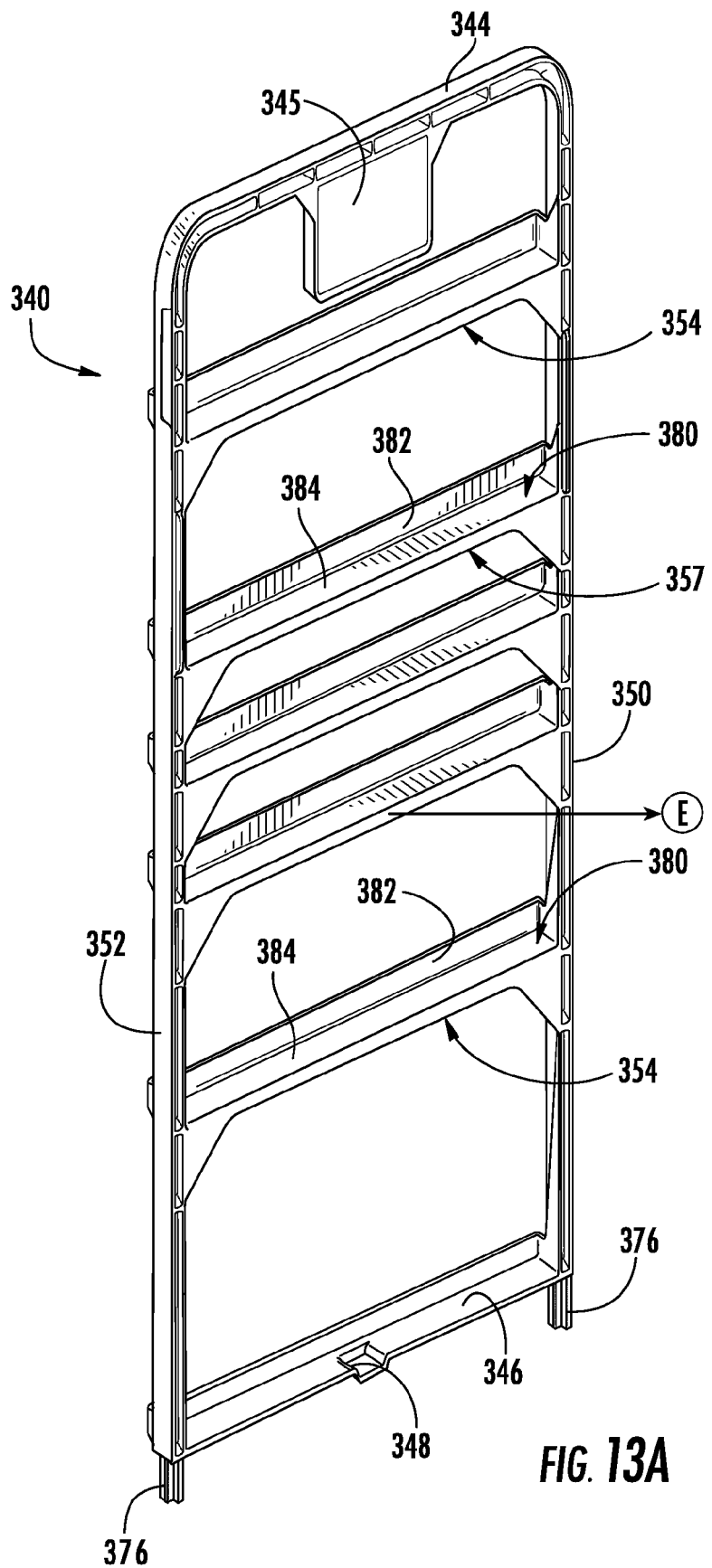
FIG. 13A is an exterior perspective view of an upright according to another embodiment.

Referring now to FIG. 13A, a side attachment member 340 is shown from an exterior side. In this configuration, the side attachment member 340 resembles side attachment member 40 shown in FIG. 1 as disposed on retail cart 10. In the embodiment shown in FIG. 13A, support members 354 are disposed below and above three support members 357. On the exterior side of the side attachment members 340, the support members 354, 357 have a similar configuration including a shelf receiving channel 380 which comprises an upright wall 382 and a horizontal landing portion 384. Thus, the support members 354, 357 are adapted to support wire shelves, such as wire shelves 70 and 370, using the shelf receiving channels 380 disposed on an exterior side thereof as shown in FIG. 11.

Figure 13B:
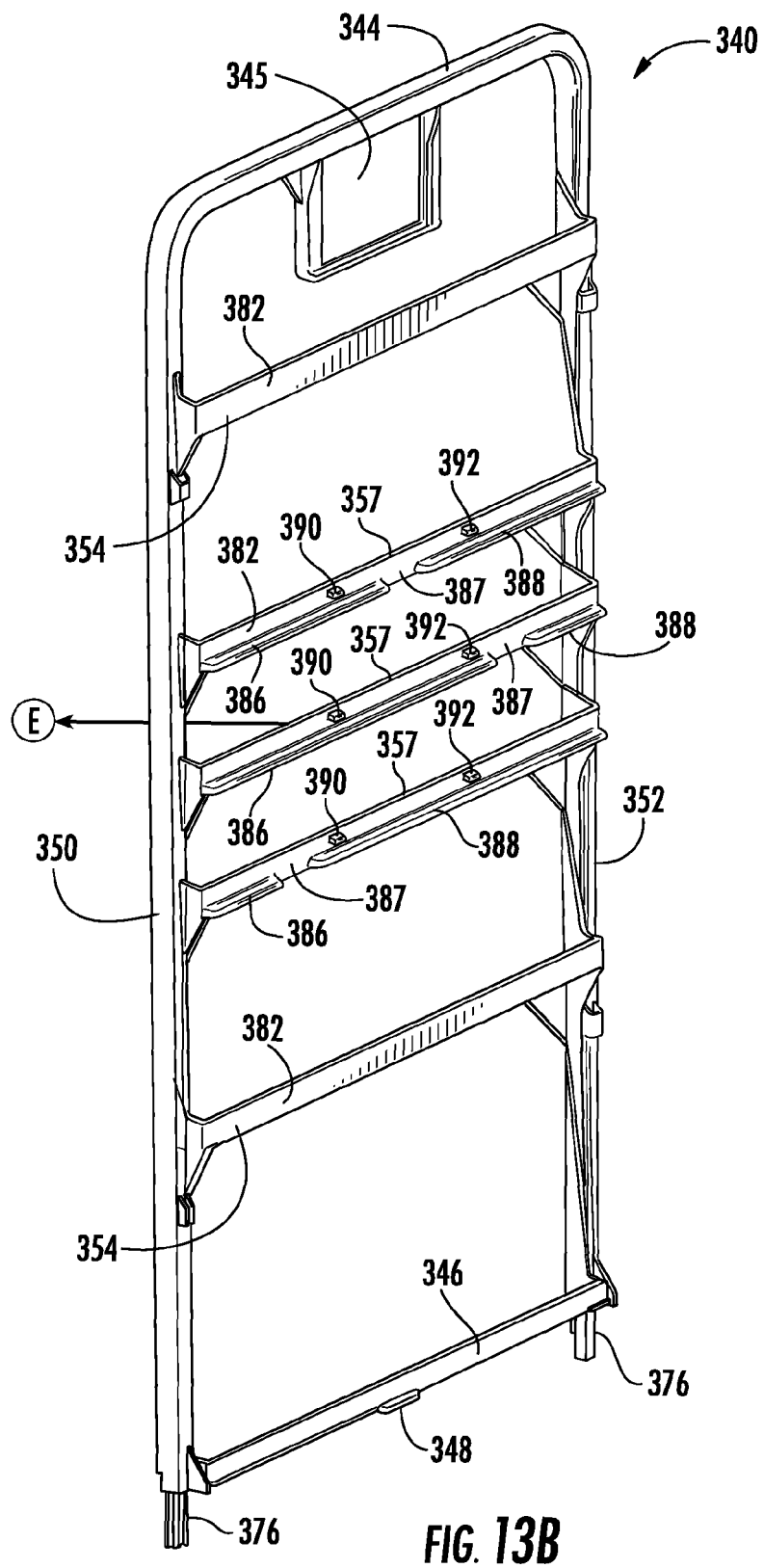
FIG. 13B is an interior view of the side attachment member of FIG. 13A.

Referring now to FIG. 13B, the interior side of the side attachment member 340 is shown where configurational differences between the support members 354 and 357 are indicated. Specifically, in this embodiment, the support members 357 include internal landings 386, 388 which are separated by a gap 387. In assembly, the internal landings 386, 388 are adapted to slideably support wire shelving units 371 as further described below. The upright walls 382 of the support members 357 further include front and rear abutment or engagement members 390, 392 which are disposed above the internal landings 386, 388. In use, the abutment members 390, 392 are adapted to limit the movement of a wire shelf as slideably supported on the internal landings 386, 388. Wire shelving units 371 can also be slideably supported safely on the top portions of upright walls 382, such that wire shelving units 371 can be supported on support members 357 without the need for landings 386, 388.

Figure 13C:
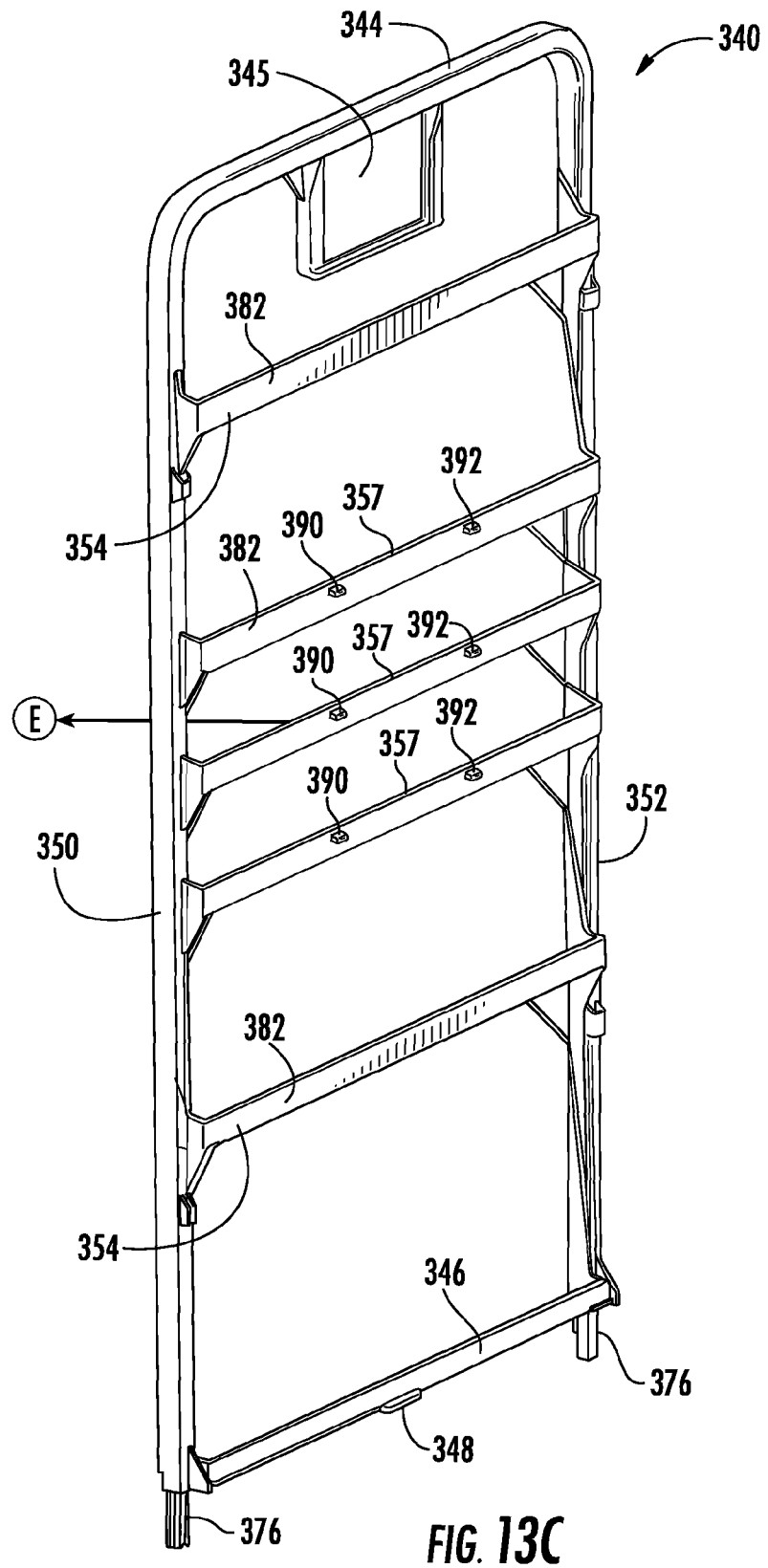
FIG. 13C is an interior view of a side attachment member of FIG. 13A according to another embodiment.

Referring now to FIG. 13C, the interior side of side attachment member 340 is shown, however, in this embodiment, the internal landings 386, 388 depicted in FIG. 13B are removed. As noted above, in this configuration, the side attachment member 340 can still support wire shelving units 371 without internal landings 386, 388, by supporting the wire shelving units 371 from the top portions of upright walls 382.

Referring now to FIG. 14, wire shelving units 370 are shown supported on lower crossbar 346 and support members 354. The wire shelving units 370 are supported on the support members 354 via support guides 372 which are similar in function to support guides 70 described above and shown in FIG. 5C. Thus, in assembly, the support guides 372 are slideably supported on the exterior landings 384 of support members 354. Wire shelving members 371 are shown supported on support members 357 and are generally supported on the upper portions of upright walls 382 of the support members 357. The wire shelving units 371 are slideably supported on the upper portions of the upright walls 382 and are engaged with the retail cart 310 on the interior side of the support members 357 in movement limiting manner as further described below. As noted above, and further shown in FIG. 14, the front and rear casters 318A, 318B are inset relative to fixed casters 319 disposed therebetween. In this way, the retail cart 310 is adapted to pivot 360° on center, such as the center of the base unit 312, about a pivot axis provided by the fixed casters 319 in assembly.

Figure 15A:
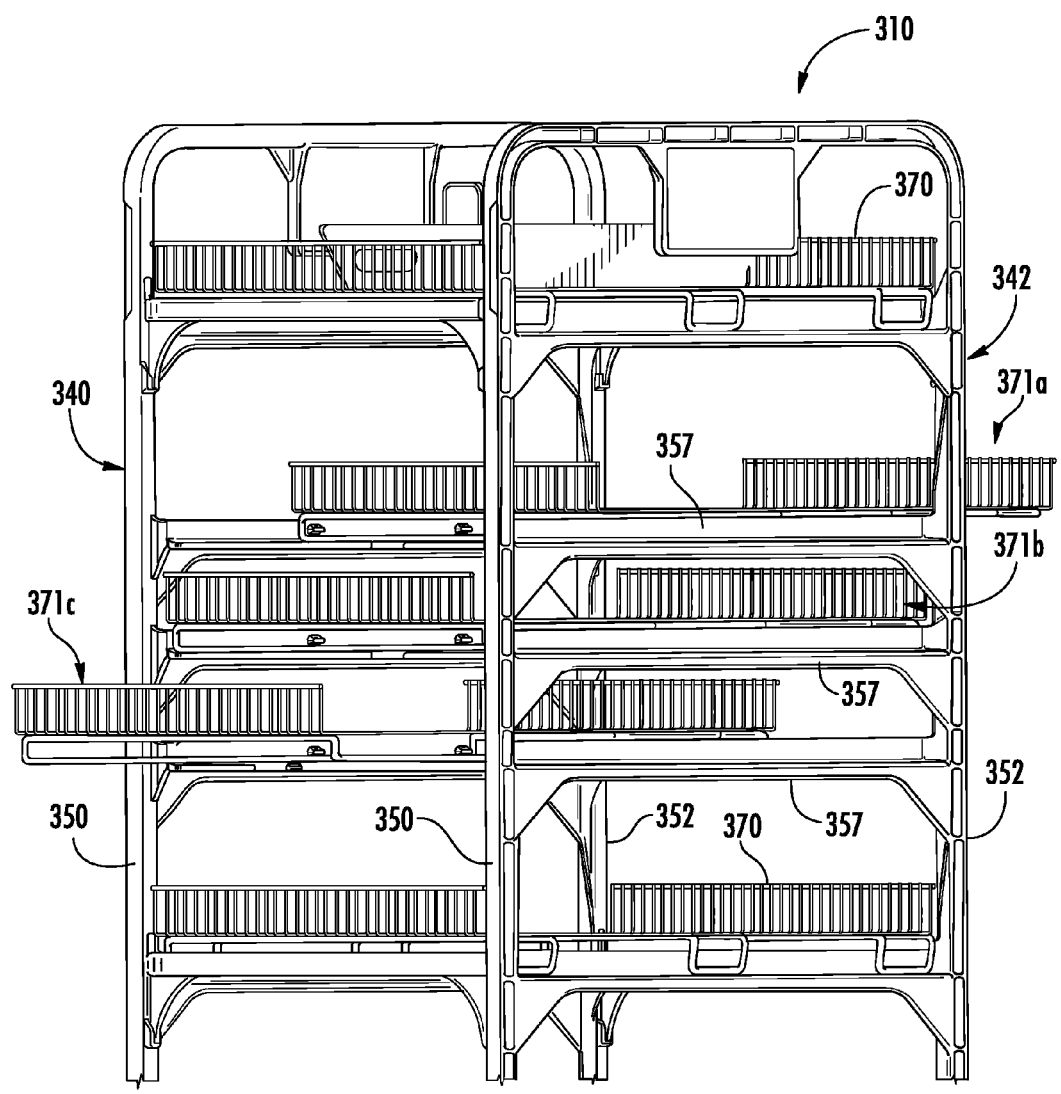
FIG. 15A is a fragmentary perspective view of the retail cart shown in FIG. 11 having one or more shelves disposed in an extended position.
Figure 16:
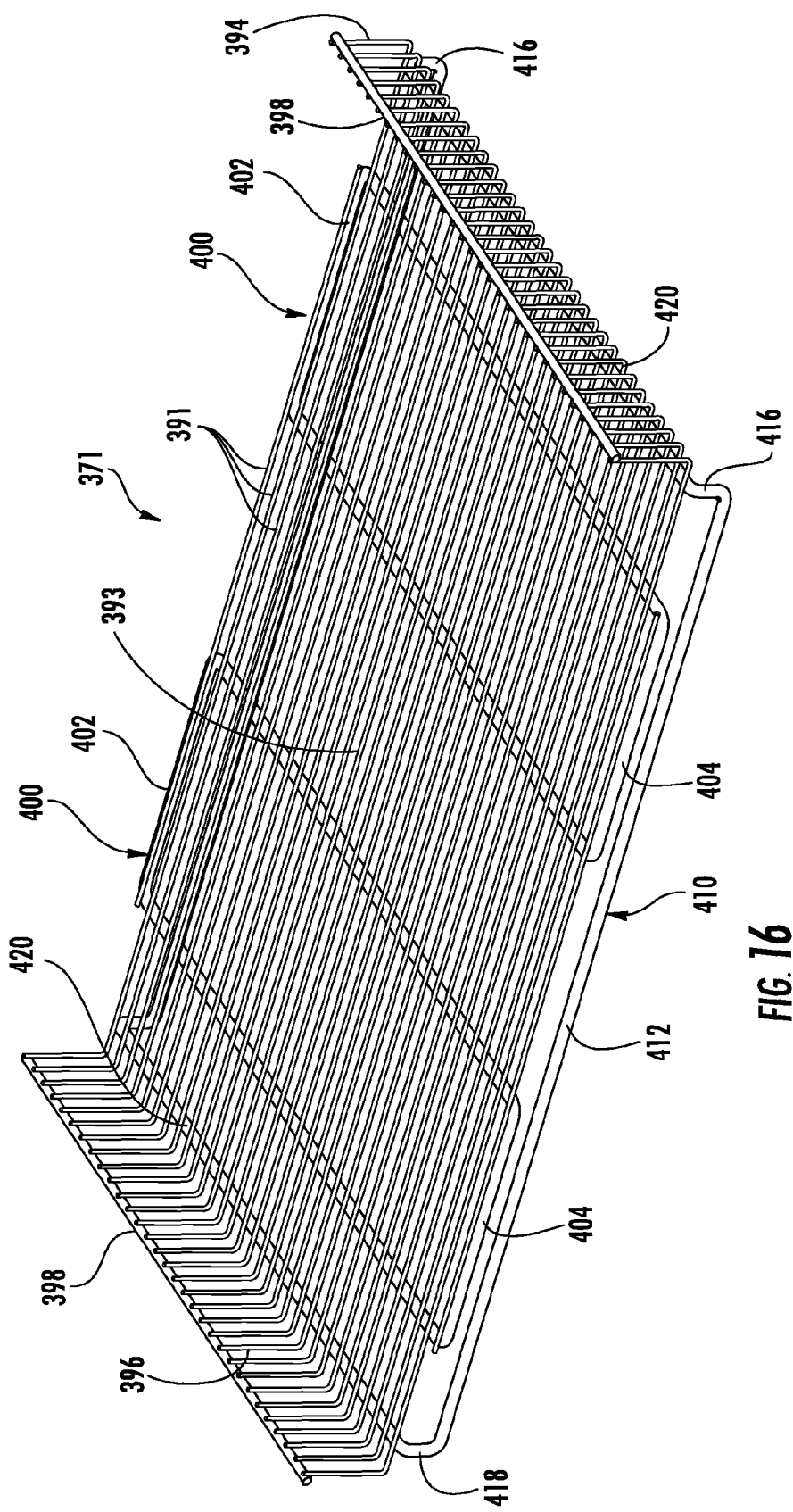
FIG. 16 is a perspective view of a wire shelf member.

Referring now to FIG. 16, a wire shelving unit 371 is shown as removed from the retail cart. The shelving unit 371 includes a plurality of parallel spaced-apart wire members 391 which define a central landing area 393 which is flanked on opposite sides by front and rear retaining walls 394, 396. The front and rear retaining walls 394, 396 are defined by bends in the wire members 391 having cross members 398 disposed at terminal ends thereof. In the embodiment shown in FIG. 16, the wire shelving unit 371 includes wire support members 400 which are generally rectangular shaped and include terminal ends 402, 404. In assembly, the terminal ends 402, 404 support the wire shelf 371 on the upper portion of upright walls 382, such that the wire shelving unit 371 is slideably supported on the support members 357 in two directions as shown in FIGS. 15A and 15B. As shown in FIGS. 16 and 17, the wire shelving unit 371 further comprises a track guide 410 which is generally rectangular in shape and includes downturned terminal ends 412, 414. The terminal ends 412, 414 include front and rear abutment portions 416, 418 with wire support sections 420 disposed therebetween. In assembly, the tack guides 410 are adapted to support the wire shelving unit 371 on the interior landings 386, 388 at terminal ends 412, 414 when landings 386, 388 are disposed on a side attachment member as shown in FIG. 13B. Further, the wire shelves 371 can also be supported on a support guide 357 which do not have interior landings 386, 388, like side attachment member 340 shown in FIG. 13C, as the terminal ends 402, 404 of support members 400 can rest and be supported along the top portion of upright wall 382 disposed on the support members 357.

Referring now to FIGS. 15A and 15B, wire shelving units 371 are shown supported on support members 357 in a two-way slideable manner, such that the wire shelving units 371 can be extended beyond the front and rear portions of retail cart 310 for easy access to items stored thereon. Thus, as shown in FIG. 15A, three wire shelving units 371a, 371b, and 371c are shown arranged on the retail cart 310 in varying configurations. Wire shelving unit 371a is shown extending beyond rear uprights 352, while wire shelving unit 371b is disposed fully within the retail cart 310 between front and rear uprights 350 and 352, and wire shelving unit 371c is shown extended beyond front uprights 350 of side attachment members 340, 342. Thus, the wire shelving units 371 are adapted to move to any number of positions in both front and rear directions as supported on support members 357 with wire shelf 371c representing a first extended position, and wire shelf 371a representing a second extended position. Up to approximately 60% of the landing area 393 can be exposed outside of the retail cart 310 when a wire shelf 371 is fully extended in either frontward or rearward positions.

As shown in FIG. 15B, the wire track guides 410 are adapted to effectively surround front and rear engagement members 390, 392 in assembly. Thus, as wire shelving units 371a and 371c move rearward in a direction that is indicated by arrows C, abutment portions 416 of the wire track guides 410 are adapted to abut front engagement members 390 when the wire shelving units 371a and 371c are fully extended in the rearward direction as shown in phantom in FIG. 15B. Similarly, with reference to wire shelving unit 371b, the wire track guide 410 is adapted to have rear abutment portion 418 abut rear engagement member 392 when the wire shelving unit 371b is moved fully forward in a direction as indicated by arrow D and shown in phantom in FIG. 15B. In this way, the wire track guides 410 of the shelving units 371 are adapted to retain the wire shelving units 371 on the support members 357 between both forward and rearwardly extended positions.

In assembly, a wire shelving unit 371 is fitted on a pair of associated support members 357 by first engaging either end 412 or 414 of wire track members 412 with an associated support member 357 disposed on either side attachment member 340, 342. Once the wire track member is situated such that front and rear abutment portions 416, 418 are disposed on either side of front and rear engagement members 390, 392, the support member 357 on the opposite side thereof is adapted to flex outwardly to allow for the opposite side 412 or 414 of the wire track guides 410 to engage the support member 357. Thus, the support members 357 are flexibly resilient such that they can be moved outwardly, in a direction as indicated by arrow E in FIG. 13A, to a deformed position necessary to fit the wire shelving units 371 therebetween. Once a wire shelving member 371 is in place while one of the support members 357 is in the deformed or flexed position, the deformed support member 357 can be released to resiliently resume its generally parallel configuration, or at-rest position shown in FIG. 13A, thereby positively capturing the wire shelving unit 371 on the retail cart 310 via engagement members 390, 392 as described above.

Referring again to FIG. 11, it is noted that the wire shelving units 370 are supported on support members 354, however, it is noted that the shelving units 370 can also be supported on support members 357 as the exterior configuration of the support members 354, 357 is the same. Thus, having receiving channels 380 disposed on the exterior portions of the support members 354, 357, a wire shelf 370 can be supported on either support member 354, 357. However, in the embodiments shown herein, the entire shelving unit 371 is most suitable for engagement and support on support members 357 which include engagement members 390, 392 to positively capture and limit the movement of the shelving members 371. While it is contemplated that the wire shelving units can also be supported on support member 354, it is noted that without the interior front and rear engagement members 390, 392, such a wire shelf would move freely along the support members 354. In assembly, the retail cart 310 can include any number of support members 354 and 357 in an effort to provide a customized retail cart for the consumer.

Figure 18A:
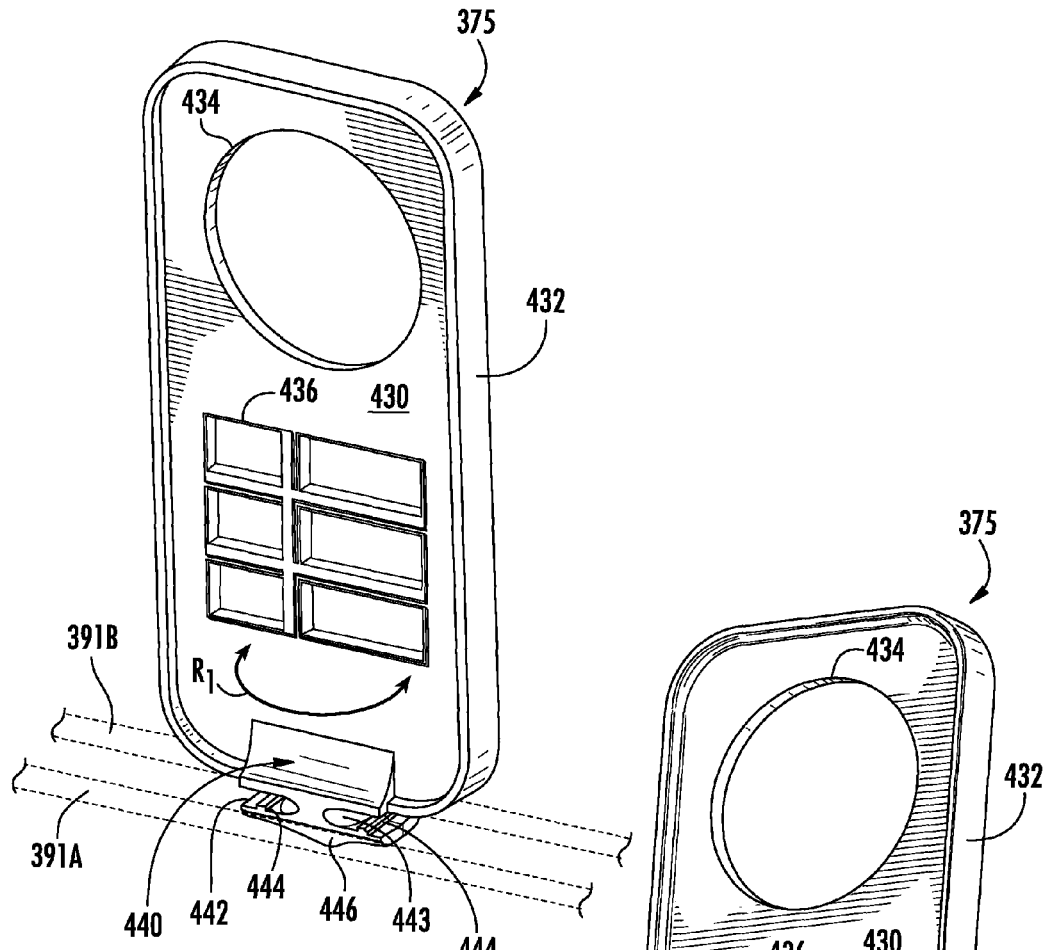
FIG. 18A is a perspective view of a separator assembly according to another embodiment of the present invention, wherein the separator assembly is in a disengaged position.
Figure 18B:
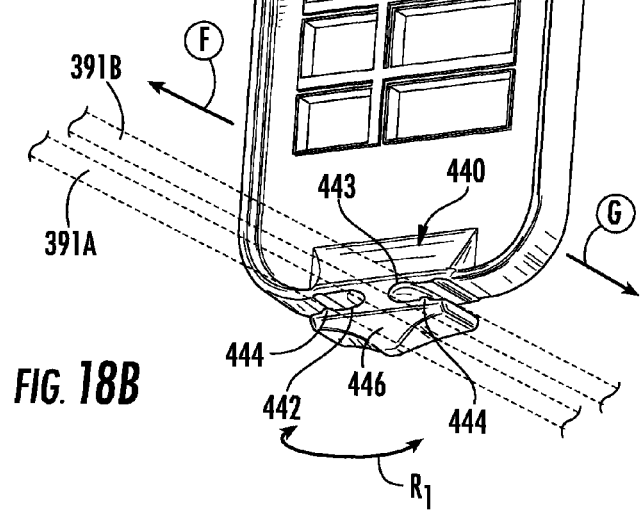
FIG. 18B is a perspective view of the divider assembly as shown in FIG. 18A in an engaged position.

Referring now to FIGS. 18A and 18B, a separator 375 is shown in unengaged position (FIG. 18A) and in engaged position (18B). The separator 375 is similar to separator 375 shown in FIG. 11 attached to wire shelving unit 370. The separator 375 includes a generally planar body portion 430 having a rim 432 disposed thereabout. In the embodiment shown in FIGS. 18A and 18B, the separator 375 includes an open aperture 434 and a window feature 436. Aperture 434 and window 436 can be used to view merchandise stacked behind the separator or to organize several separators when not in use. Further, incorporating aperture 434 and window 436 into the separator design reduces the amount of material needed to mold the separator 375. The separator 375 further includes a base member 440 which is generally an I-shaped member defined by opposing and outwardly opening channels 442, 443. Engagement members 444 are disposed in both channel 442 and 443 and are adapted to retain the separator 375 in a slideable manner on a pair of serially aligned wire members. As shown in FIG. 18A, separator 375 is in an unengaged position, wherein the base member 440 is positioned such that a lower member 446 disposed below channels 442, 443 is parallel and disposed between adjacent wire members 391A and 391B. Once positioned in this unengaged manner, the separator 375 can be rotated in a direction as indicated by arrow $R_1$ to the engaged position shown in FIG. 18B. Thus, by grasping the separator 375 at the planar body portion 340 or rim portion 432, a user can rotate the separator 375 from an unengaged position (FIG. 18A) to an engaged position (FIG. 18B) along serially aligned and adjacent wire members 391A, 391B. Thus, the separator 375 is adapted to couple to a wire shelving unit, such as wire shelving unit 370 shown in FIG. 11 to separate and divide merchandise as necessary. As further shown in FIG. 18B, the separator 375 can move laterally along the wire members 391A, 391B in two directions as indicated by arrows F and G.

Figure 19:
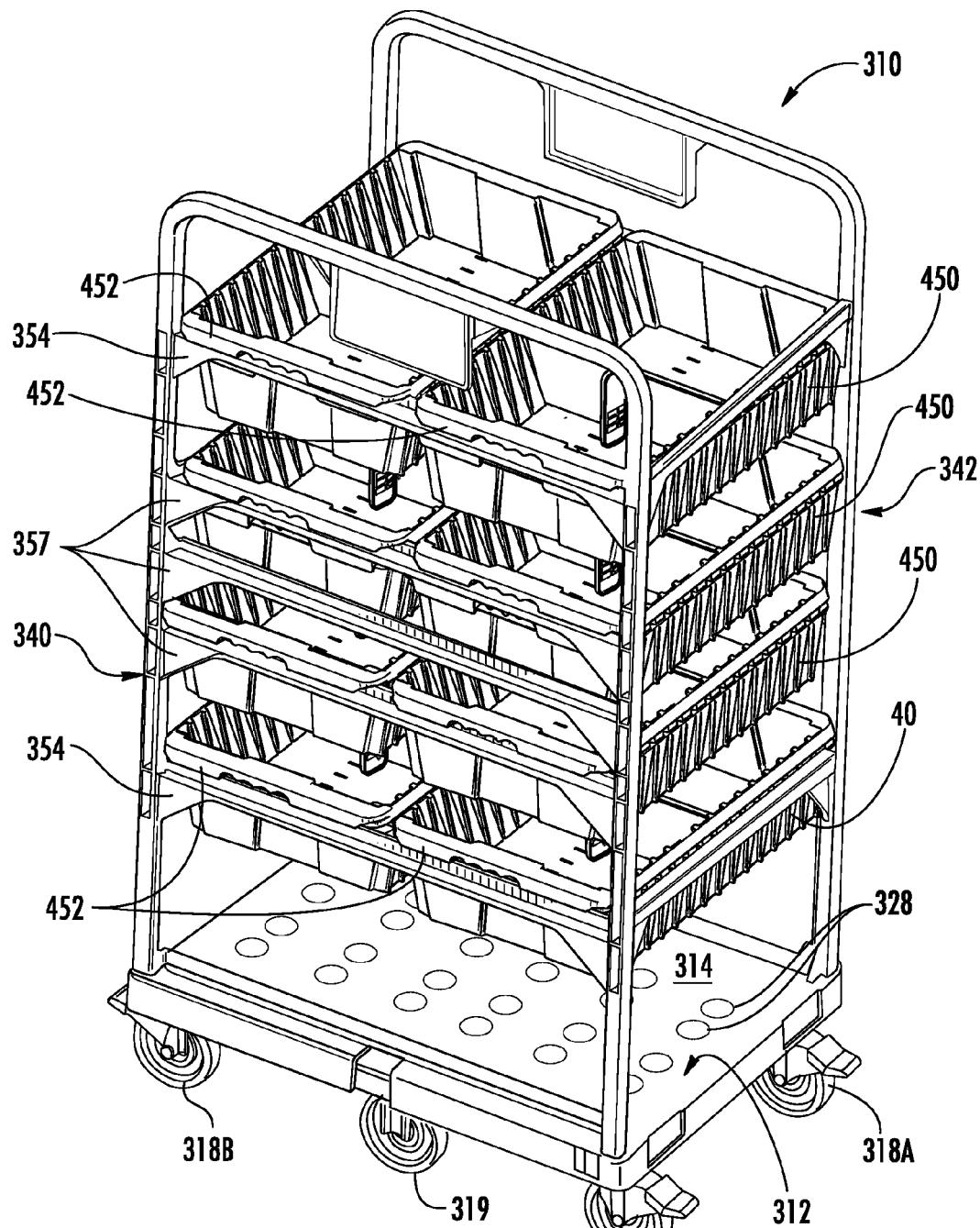
FIG. 19 is a perspective view of a retail cart supporting a plurality of containers.

Referring now to FIG. 19, the retail cart 310 is shown having a plurality of containers 450 supported on the support members 354, 357. The containers 450 include lip portions 452 which generally rest on the upper portions of upright walls 382 of the support members 354, 357, such that the containers 450 are slideably supported thereon. Thus, the retail cart 310 is adaptable to a number of configurations wherein the retail cart 310 can support merchandise on shelving units, such as shelving units 370, 371, or containers, such as container 450 shown in FIG. 19.

Referring now to FIG. 20A, a base unit 312 is shown from an underside 316, wherein the base unit 312 includes cross-sectional reinforcement members 315 which are adapted to provide rigidity to the overall structure of the base unit 312. The base unit 312 further includes metal caster brackets 460 which are coupled to the base unit 312 via the coupling of the casters 318A, 318B and 319 as further shown and described with reference to FIG. 20B.

Referring now to FIG. 20B, the caster brackets 460 and casters 318A, 318B, and 319 are shown exploded away from the base unit 312. The caster brackets 460 include apertures 462 which are adapted to align with apertures 468 disposed on caster plates 466. Thus, the casters 318A, 318B, and 319 include caster plates 466 having apertures 468 disposed about the outer four corners as shown in FIG. 20B. The caster plates 466 further include apertures or recesses 470 which are adapted to align with alignment apertures 464 disposed on the caster brackets 460. Spacing plates 463 are shown in this exploded view which provide an offset for casters 319 relative to casters 318A and 318B. Caster brackets 460 are L-shaped members having flange 467 which is adapted to be received in receiving channel 469 disposed on base unit 312. Further, the base unit 312 includes channels disposed near the front and rear ends 320, 326, which are adapted to receive steel reinforcement members in assembly. In this way, the steel reinforcement members and the caster brackets 460 help to keep the base unit 312 rigidified, in such a manner that the base unit 312 will resist any type of twisting movement in use. The attachment of the casters 318A, 318B, and 319 is shown in FIG. 20A and further described below. In assembly, the caster brackets 460 provide rigidity to the base unit 312 and are generally contemplated to be comprised of a metallic material, such as steel.

Referring now to FIG. 20C, the base unit 312 is shown from a top perspective view and includes the upper surface 314 having a plurality of apertures 328 and recessed semicircle portions 330A, 330B, and 330C which, in a stacking configuration, are adapted to cradle and house casters 318A, 319, and 318B, respectively, when one base unit is stacked upon another. The upper surface 314 further includes recesses 332 which are adapted to align with recessed portions 348 (FIGS. 13A and 13B) disposed on lower crossbar 346 for aligning the side attachment members 340, 342 (FIG. 11) on the base unit 312. At the outer four corners of the base unit 312, apertures 378 are disposed which frictionally engage connection members 376 disposed on the lower portions of the front and rear uprights 350, 352 of the side attachment members 340, 342, as shown in FIGS. 13A and 13C.

Figure 21A:
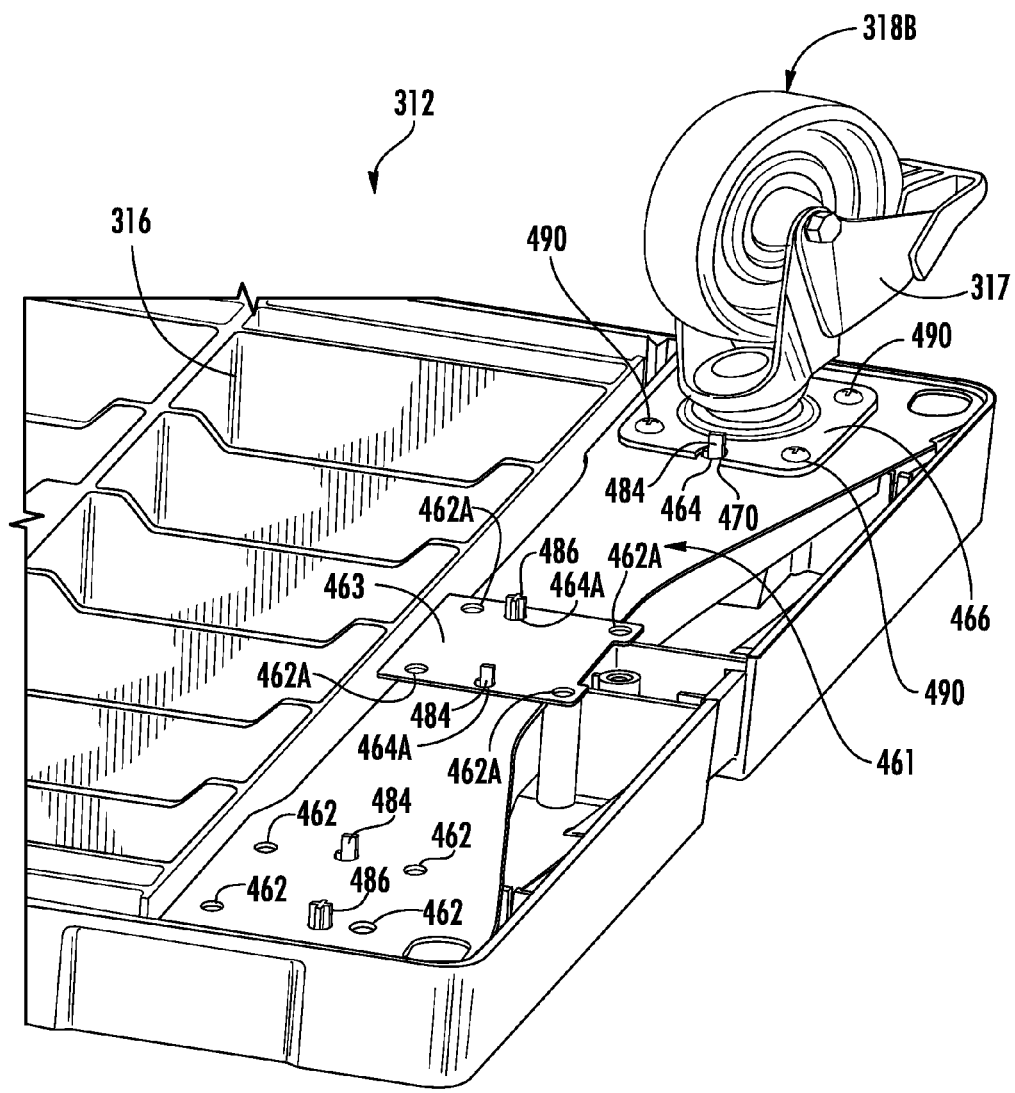
FIG. 21A is a fragmentary bottom perspective view of a base unit according to another embodiment of the present invention.
Figure 21B:
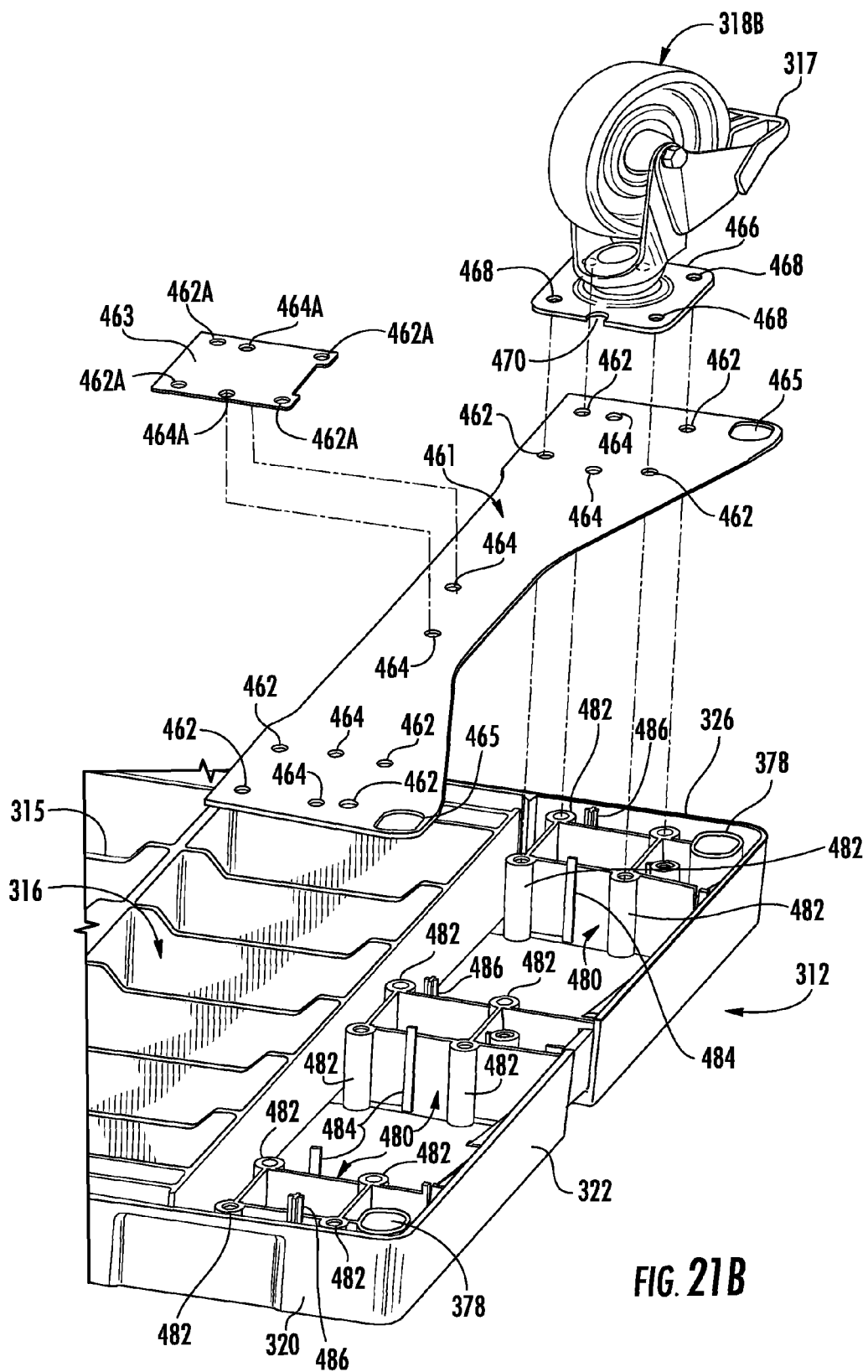
FIG. 21B is an exploded view of the base unit of FIG. 21A.

Referring now to FIG. 21B, another embodiment of a caster bracket 461 is shown having apertures 462 which align with apertures 468 disposed on the caster plates 466. The caster bracket 461 further includes apertures 464 which align with apertures or recesses 470 disposed on the caster plate 466. The caster bracket 461 further includes a plate 463 having apertures 462A and 464A adapted to align with apertures 468 and recesses 470 disposed on the caster bracket 466. The plate 463 is a spacing plate which is adapted to provide the central pivoting casters 319 with an outward spacing as compared to swivel casters 318A and 318B. It is contemplated that the spacing plate 463 provides a 2 mm extension of the fixed pivoting casters 319 as compared to swivel casters 318A and 318B. However, the spacing can be more or less than 2 mm as necessary. The plate 463 may further include locating features extending outwardly therefrom, such that the spacing plate 463 can properly align a caster plate as disposed thereon. Such locating features facilitate automated assembly of the retail cart of the present invention. Finally, the caster bracket 461 further includes apertures 465 disposed at outer corners thereof which are adapted to align with receiving apertures 378 disposed on the base unit 312 for receiving connecting members 376 disposed on the side attachment members 340, 342 as shown in FIGS. 13A and 13B.

As best shown in FIG. 21B, the base unit 312 includes caster receiving reinforcement members 480 which, in this embodiment, are rectangular shaped integrally molded receiving units disposed on the underside 316 of the base unit 312. The receiving reinforcements comprise receiving cylinders or members 482 disposed on the four corners thereof. In assembly, the receiving cylinders 482 are adapted to receive a fastener which first passes through aperture 468 disposed on the caster plate 466, then through aperture 462 disposed on caster bracket 461 and finally into the receiving cylinders 482 of the reinforced receiving members 480. Further disposed on the receiving reinforcement members 480, first and second locating features 484 and 486 are disposed in eccentric manner relative to one another. The first and second locating features 484, 486 are adapted to align with the locating receiving apertures 464 disposed on the caster bracket 461, such that the caster bracket 461 is placed on and engaged with the base unit 312 in a proper manner. Thus the locating features 484, 486 provide for quick positioning of the caster bracket 461 on the base unit 312 and the eccentric nature of the locating features 486, 484 ensures that the caster bracket 461 is properly positioned each time. This positioning arrangement facilitates automated assembly of the retail cart 310. The connection of the fasteners is best shown in FIG. 21B by dashed lines. The receiving of the locating features 484, 486 is best shown in FIG. 21A where the locating features 484, 486 are shown disposed through locating apertures 464 disposed on the caster bracket 461 and through locating apertures 464A disposed on the spacing plate 463. Protruding through the apertures 464 of the caster bracket 461, the locating features 484, 486 are further adapted to align with and be received in apertures 470 disposed on the caster plates 466 as shown in FIG. 21A. In this way, the casters, such as caster 318B shown in FIG. 21A, is easily located on the caster bracket assembly 461 for proper positioning using the locating features 484, 486. When properly positioned thereon, the caster 318B is fastened to the base unit 312 using fasteners 490. In the embodiment shown in FIGS. 21A and 21B, the locating features 484, 486 are shown in the form of square pegs and cross-sectional pegs respectively. The eccentric alignment of the locating features 484, 486 further combined with the configurational differences of the locating features 484, 486 provides for quick assembly of the caster bracket 461 to the base unit 312 and further ensures proper placement of the casters 318A, 318B, and 319 respectively. Further, it is contemplated that the caster plate 466 disposed on fixed casters 319 is of a different size and shape as compared to the caster plates 466 disposed on casters 318A and 318B. In this way, the fixed caster 319, as shown in FIG. 20B, is consistently and properly positioned intermediate to casters 318A and 318B to function as a pivoting caster in assembly. It is further contemplated that the retail cart 310 may include receiving channels, such as receiving channels 56 described above with reference to retail cart 10 shown in FIG. 1. These receiving channels are adapted to connect one or more carts in a similar manner as described above with reference to FIG. 10. Further, the retail cart 310 is adapted to support a plurality of shelving units 370 or 371 which can slide laterally on support members 354, 357 of the retail cart 310, such that a person can be positioned on the front side of the cart while another person is positioned on the rear side of the cart, and the cart 310 can accommodate both users via the two-way sliding shelf system moving laterally to extend beyond the front and rear portions of the cart 310. A retail cart 310 can also incorporate a peg board centrally located on the base unit 312 and connected to the side attachment members 340, 342. In this way, the retail cart 310 can provide a simulated merchandise display for a store, such that the goods positioned on the peg board of the retail cart 310 can be easily transitioned to the actual store display. The retail cart described above can have front and rear side walls providing a roll base, in a preferred embodiment, of 23-28 inches, thereby providing adequate dimensions for stocking retail shelves in a store environment. As noted above, the retail cart 310 is comprised of a polymeric material which makes the components of the retail cart 310 easier to handle in shipping and a lighter weight option as compared to presently known metal stocking carts. The polymeric makeup of the carts may include a glass particulate in the plastic mix which is combined with a virgin plastic and a coloring plastic agent which are all heated to provide a homogeneous mixture that is injection molded or otherwise form to provide a retail cart having sufficient structural properties to handle loads in the retail industry.

It will become apparent to those skilled in the art that various modifications to the preferred embodiment of the invention as described herein can be made without departing from the spirit or scope of the invention as defined by the appended claims.

The invention claimed is:

1. A polymeric retail cart for use in transporting merchandise, comprising:
    a base unit having an upper side and an underside;
    front and rear sets of casters coupled to the underside of the base unit;
    an intermediate set of casters coupled to the underside of the base unit and disposed between the front and rear sets of casters, wherein intermediate casters are offset relative to the front and rear casters, such that the intermediate casters extend outwardly from the base unit further than the front and rear casters to provide a pivoting axis for the retail cart to pivot in a 360 degree manner central to the retail cart;
    first and second side attachment members operably coupled to and extending from the upper side of the base unit in a generally upright, parallel, laterally spaced-apart relationship, wherein each side attachment member includes an outer frame member comprising an upper crossbar, a lower crossbar and laterally spaced front and rear uprights;
    a plurality of shelf support members having shelf receiving channels, wherein the shelf support members are disposed between the front and rear uprights of each side attachment member;
    one or more first engagement members disposed on an interior side of the shelf support members; a plurality of shelving units slideably and removably supported on associated shelf support members of each side attachment member, wherein the shelving units are adapted to laterally slide along the associated shelf support members of each side attachment member to extend beyond the front and rear uprights of the side attachment members in first and second extended positions;
    wherein the shelving units further comprise abutment portions that extend downwardly from the shelving units, wherein the abutment portions are adapted to abut the one or more first engagement members disposed on the interior sides of the associated shelf support members when the shelving units are in the first or second extended positions, thereby retaining the shelving unit within the retail cart;
    and wherein the shelf support members are flexibly resilient and adapted to deform outwardly to allow for a shelving unit to be received in the retail cart between associated shelf support members; and a plurality of stabilizers removably and operably coupled to an upright of the first side attachment member at a first end and operably coupled to an upright of the second side attachment member at a second end, wherein the first and second ends of each stabilizer include upper and lower attachment flanges adapted to be received in one of a receiving aperture and a receiving cradle disposed on the uprights of the first and second side attachment members,
    wherein each upper attachment flange comprises a downwardly extending retaining member; wherein each receiving cradle protrudes from a respective upright and defines a vertical channel which receives a corresponding lower attachment flange; wherein each retaining member of said upper attachment flanges defines a hook that clamps on to a bottom wall of a corresponding receiving aperture of a corresponding upright; and
further wherein the upper and lower attachment flanges impart opposing forces on the upright as coupled thereto.

2. A polymeric retail cart as set forth in claim 1, wherein: the front and rear sets of casters comprise swivel caster units, and further wherein the intermediate casters comprise fixed caster units.

3. A polymeric retail cart as set forth in claim 1, wherein: the shelving units are wire shelving units having a plurality of parallel spaced wire members defining a landing area.

4. A polymeric retail cart as set forth in claim 3, wherein: the shelving units further comprise a plurality of wire support members coupled to and disposed below the parallel spaced wire members, the wire support members each having terminal ends that rest upon upper portions of corresponding shelf support members when the shelving units are installed on the corresponding shelf support members.

5. A polymeric retail cart as set forth in claim 4, including: a plurality of dividers adapted to engage the wire support members of the shelving units to divide the landing area.

6. A polymeric retail cart as set forth in claim 3, including: a plurality of separators adapted to couple to corresponding adjacent wire members of a respective shelving unit, wherein the separators are adapted to slide along a length of the corresponding adjacent wire members for separating the landing area of the respective shelving unit.

7. A polymeric retail cart as set forth in claim 6, wherein: the separators each include a base unit having opposing and outwardly facing open channels with second engagement members disposed therein for engaging the corresponding adjacent wire members of the respective shelving unit.

* * * * *